United States Patent [19]

Sabatino et al.

[11] Patent Number: 4,510,682

[45] Date of Patent: Apr. 16, 1985

[54] APPARATUS AND METHOD FOR ASSEMBLING BATTERY CELL ELEMENTS

[75] Inventors: Anthony Sabatino, St. Paul; Edward G. Schaumburg, Askov; Peter A. Recht, Minneapolis; Douglas J. Olszewski, Inver Grove Heights; Richard T. Strait, St. Paul, all of Minn.

[73] Assignee: GNB Batteries Inc., Mendota Heights, Minn.

[21] Appl. No.: 381,227

[22] Filed: May 24, 1982

[51] Int. Cl.³ .................. H01M 6/00; B23P 19/00
[52] U.S. Cl. ...................... 29/623.1; 29/564.6; 29/730; 53/157; 53/207; 53/445; 53/462
[58] Field of Search ............. 29/623.1, 730, 564.6, 29/564.1, 33 E, 33 K, 33.5, 33.52; 53/445, 462, 157, 207, 591, 429, 117, 526, 176, 451

[56] References Cited

U.S. PATENT DOCUMENTS

| | | | |
|---|---|---|---|
| 2,157,629 | 5/1939 | Rolph | 136/147 |
| 2,654,794 | 10/1953 | Zaugg | 136/7 |
| 2,667,527 | 1/1954 | Pucher | 136/90 |
| 2,851,509 | 9/1958 | Di Pasquale et al. | 136/6 |
| 2,851,511 | 9/1958 | Bikerman | 136/143 |
| 3,856,575 | 12/1974 | Hughes | 136/134 |
| 3,920,477 | 11/1975 | Alaburda | 136/108 |
| 4,029,855 | 6/1977 | Dougherty et al. | 429/82 |
| 4,048,386 | 9/1977 | Alfenaar et al. | 29/623.1 |
| 4,051,304 | 9/1977 | Snook | 429/94 |
| 4,307,161 | 12/1981 | Brown | 429/120 |
| 4,314,403 | 2/1982 | Sanekata | 29/730 |
| 4,351,106 | 9/1982 | Brady | 29/730 |
| 4,406,057 | 9/1983 | Oswald et al. | 29/623.1 |

FOREIGN PATENT DOCUMENTS

| | | | |
|---|---|---|---|
| 52-30924 | 2/1977 | Japan . | |
| 4047 | 3/1979 | Japan | 29/623.4 |
| 2002949 | 2/1979 | United Kingdom . | |
| 2003650 | 3/1979 | United Kingdom . | |

Primary Examiner—Howard N. Goldberg
Assistant Examiner—P. W. Echols
Attorney, Agent, or Firm—Augustus J. Hipp; Dennis R. Schlemmer

[57] ABSTRACT

An apparatus and method for assembling battery cell elements having a plurality of electrode plates of alternating polarity separated by a continuous interleaved insulating sheet. The apparatus includes a separator sheet supply station; a creaser for forming transverse creases in a length of separator sheet at longitudinally spaced fold points; a first plate loader for positioning a first set of electrode plates of common polarity onto a pre-fold mechanism; a sheet transfer mechanism for transferring a cut and creased length of separator sheet from the creaser onto the first set of plates; a second plate loader for positioning a second set of electrode plates of common polarity opposite to that of the first set onto the separator sheet at locations directly above the plates of the first set; the pre-fold mechanism including a collapsible pre-fold paddle assembly for folding the separator sheet into relatively loose accordian folds with the plates of the first and second sets occupying alternate folds on opposite sides of the separator sheet; an intermediate fold mechanism for engaging the pre-folded element, positioning the plates thereof into relatively precise alignment, and compressing the element into a tighter intermediate folded assembly; and a final fold mechanism for engaging the intermediate folded assembly, compressing the assembly into final element form, transporting the element through a series of tape applicators to secure it in its final form and then to a discharge station. The apparatus includes a master controller that controls operation of the plurality of mechanisms to permit automatic and continuous high volume production of such battery cell elements.

59 Claims, 44 Drawing Figures

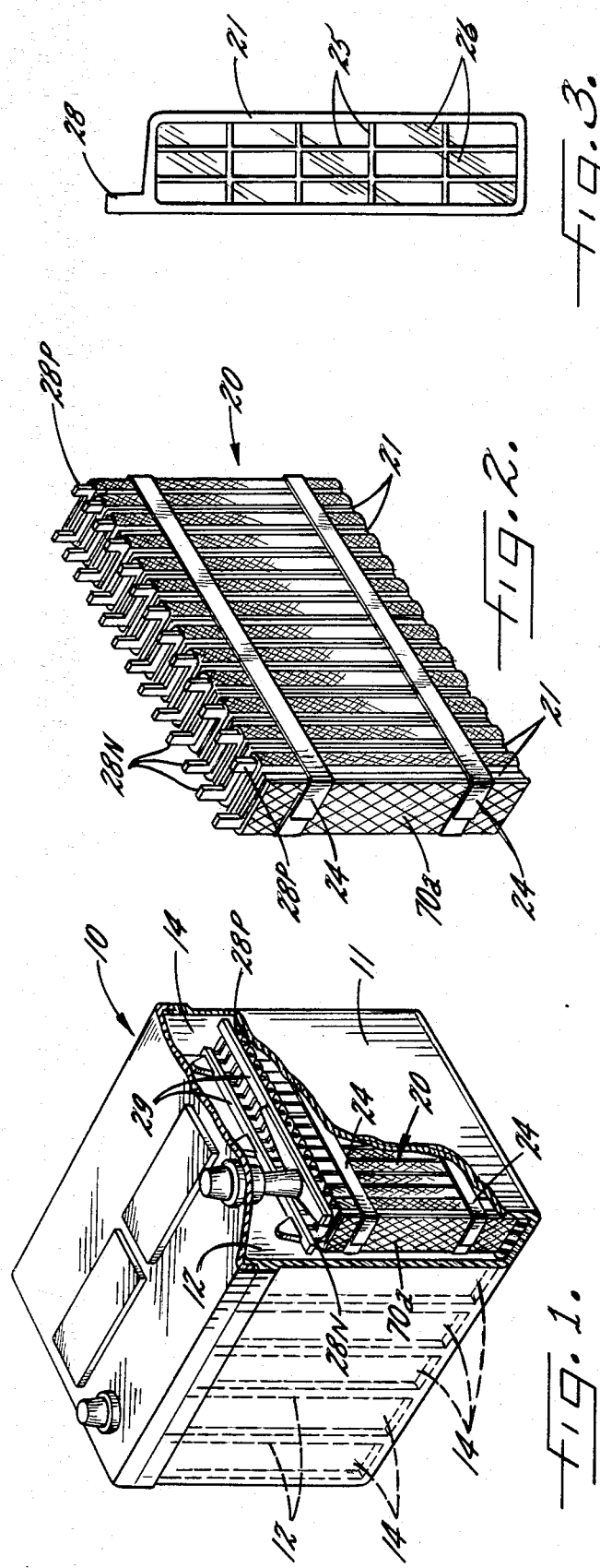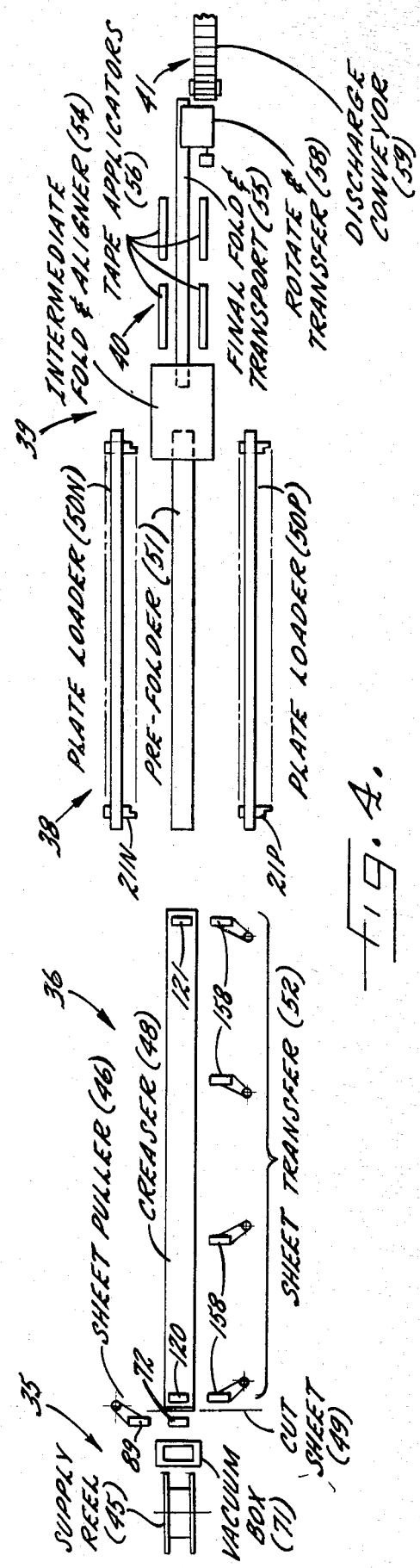

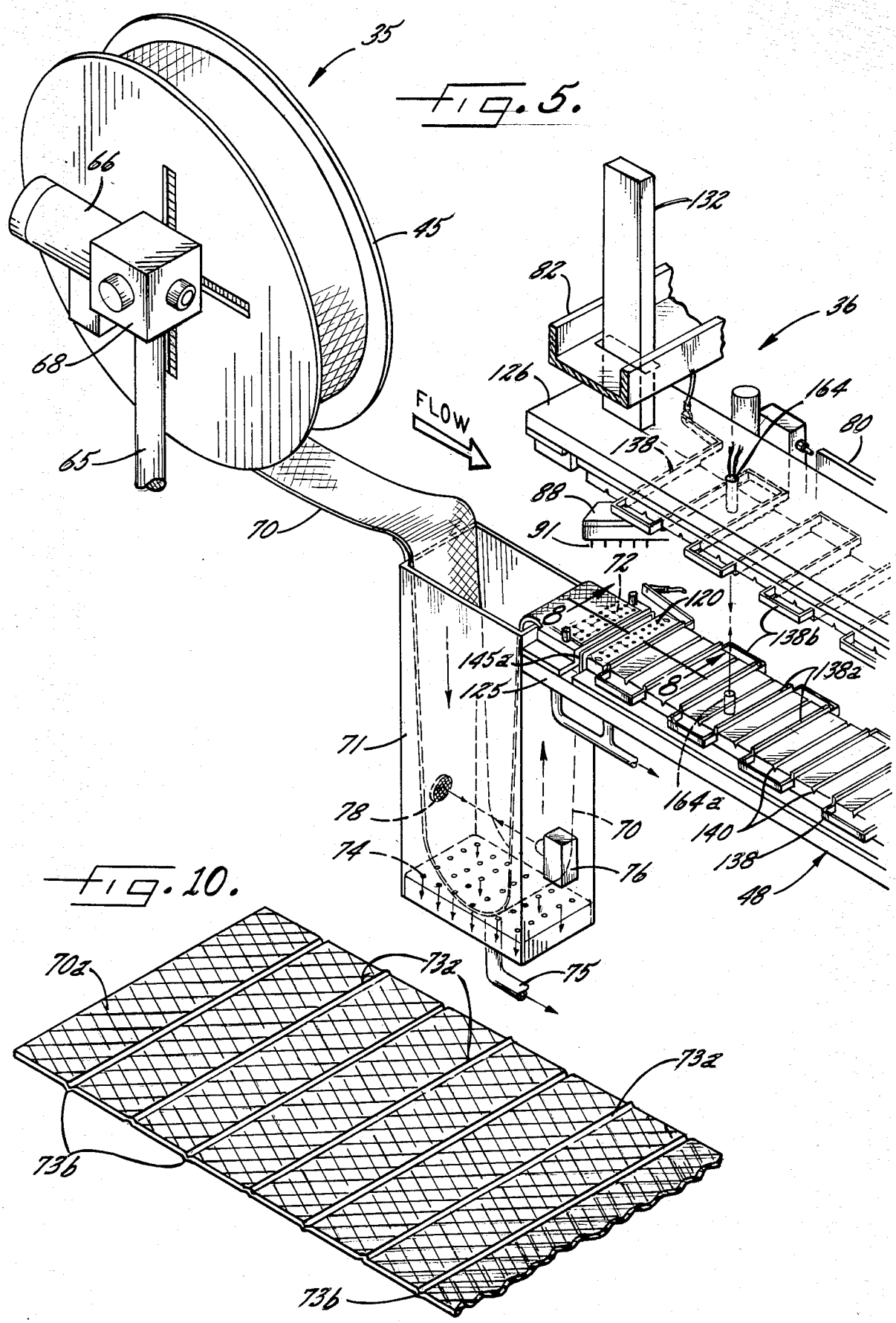

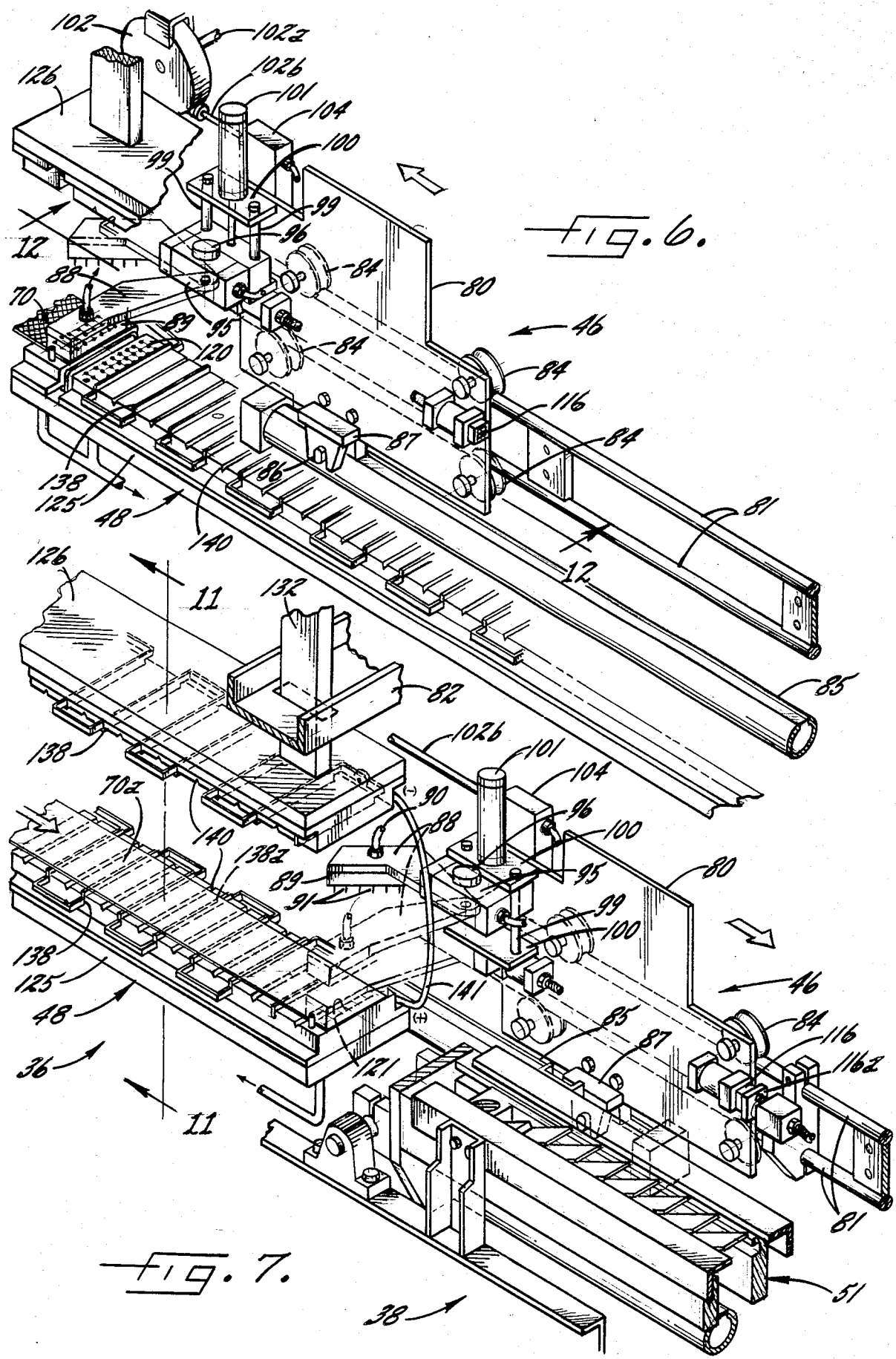

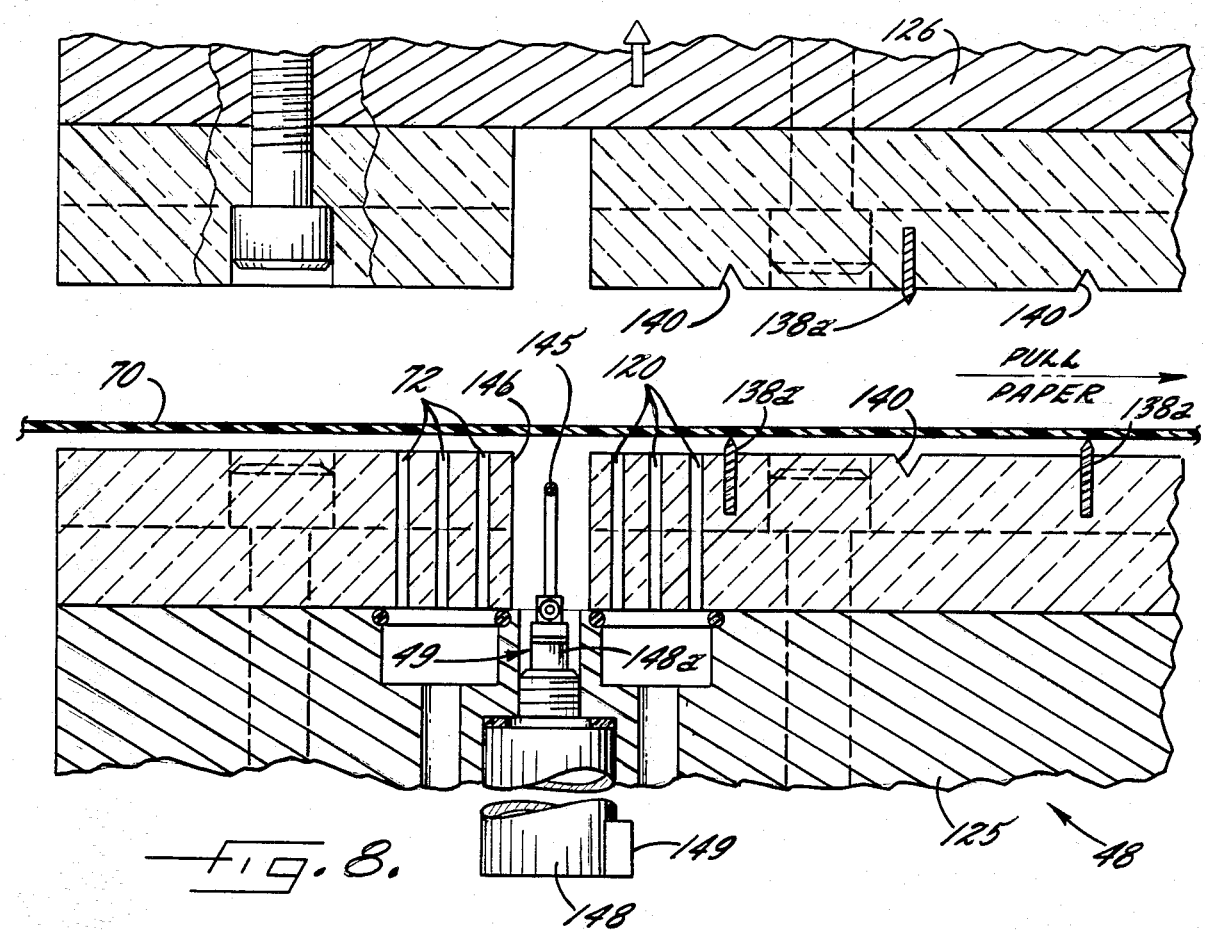
_Fig. 8._
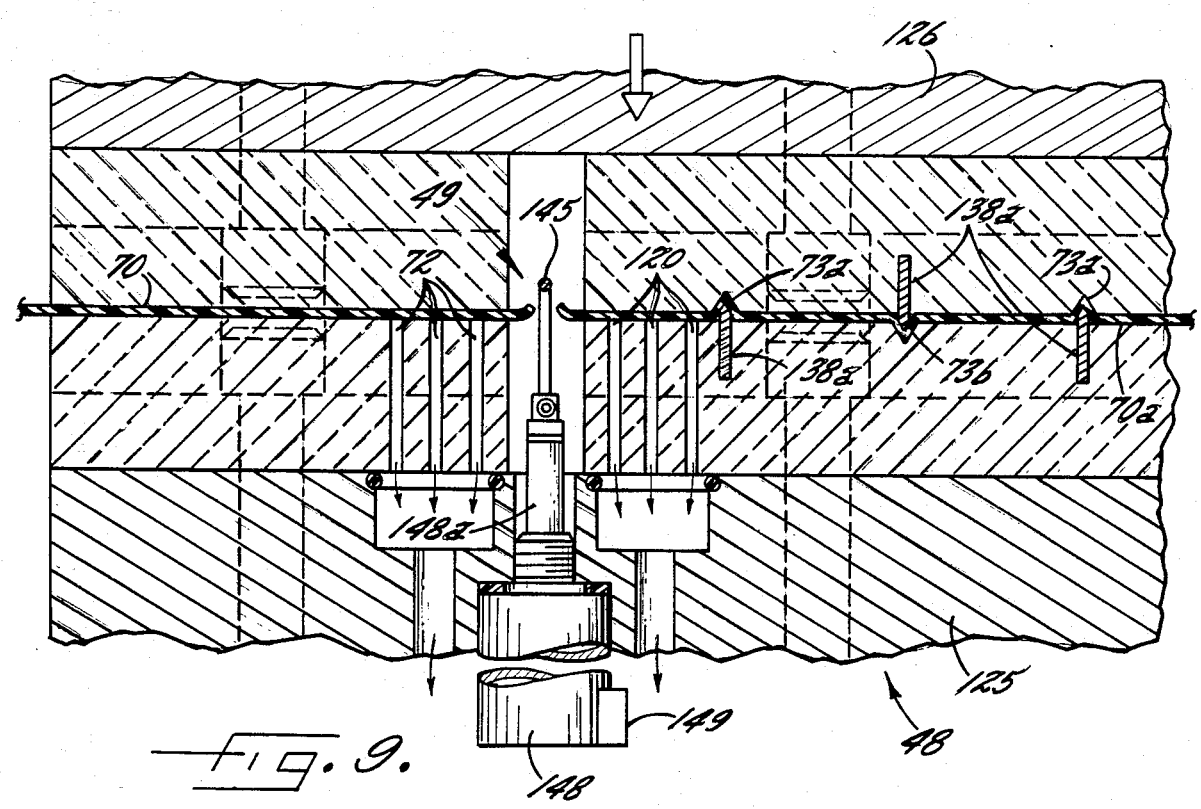
_Fig. 9._

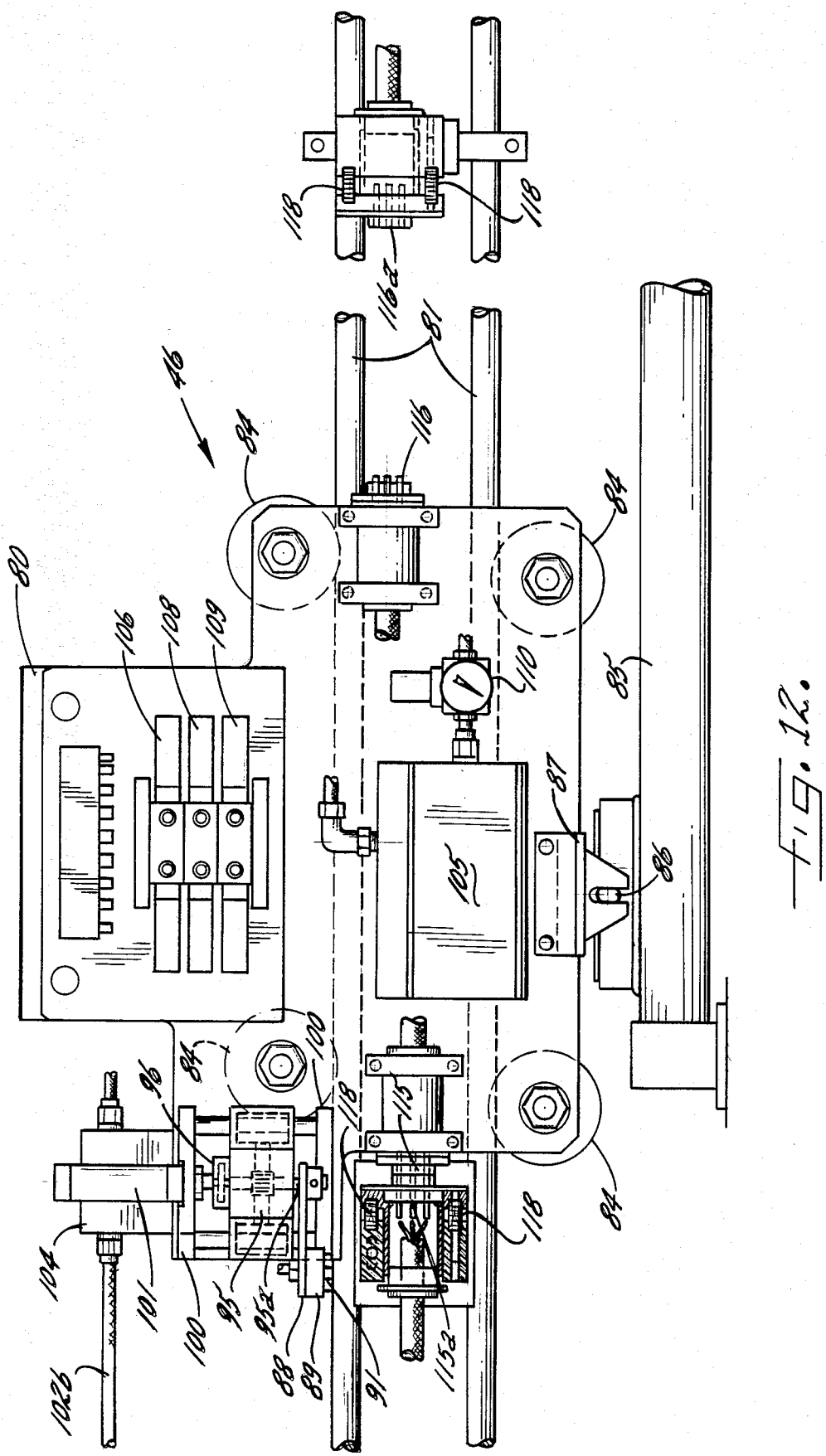

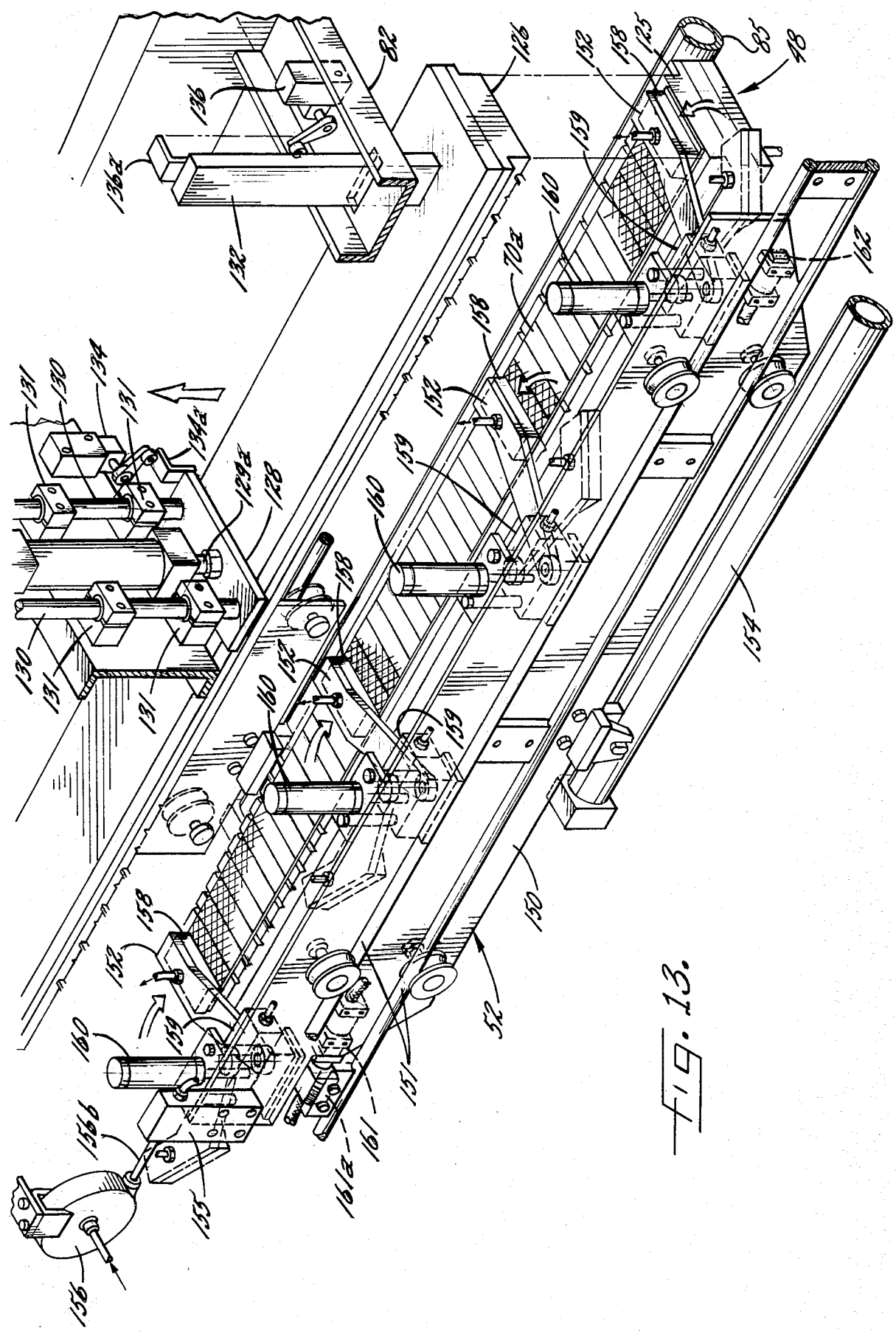

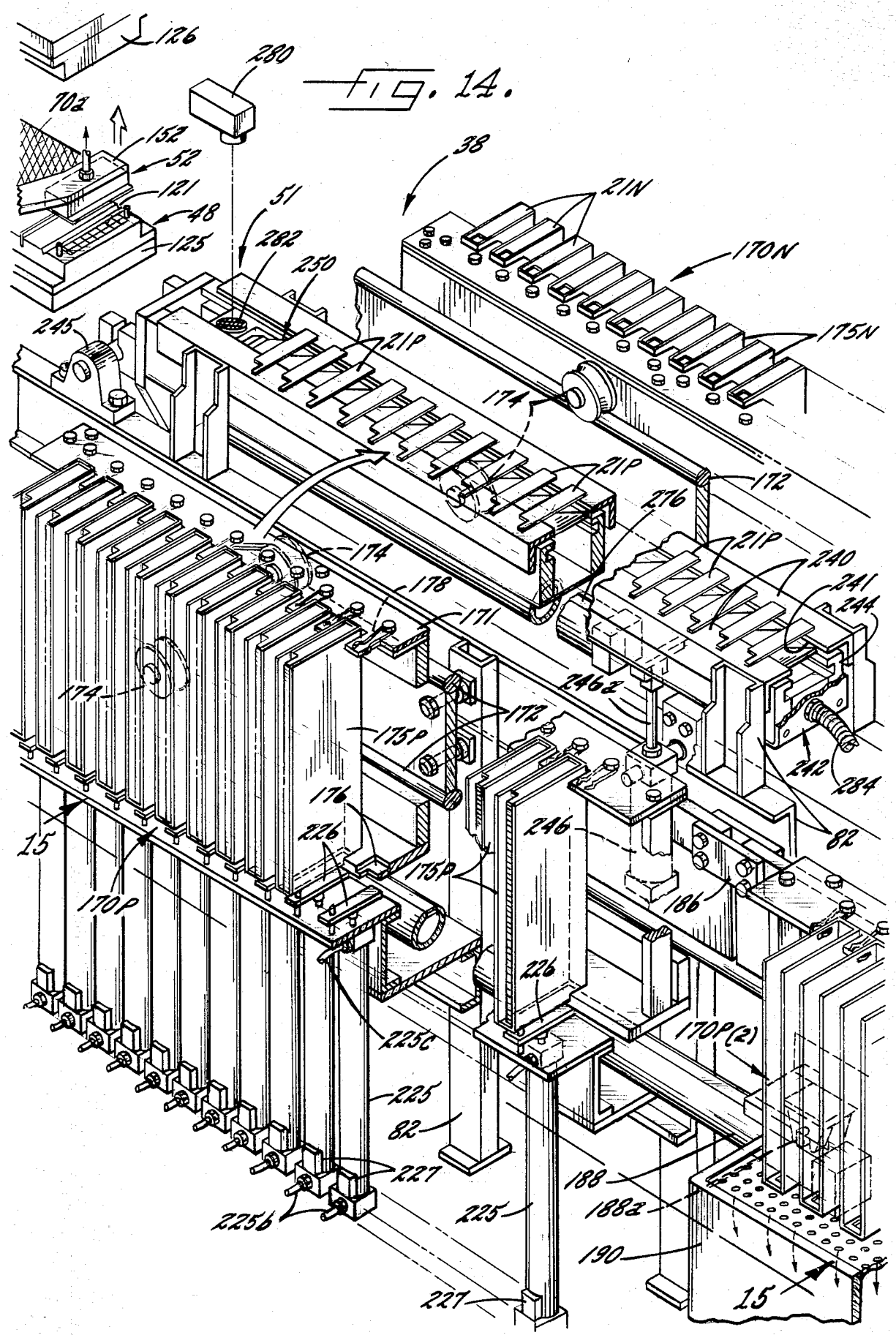

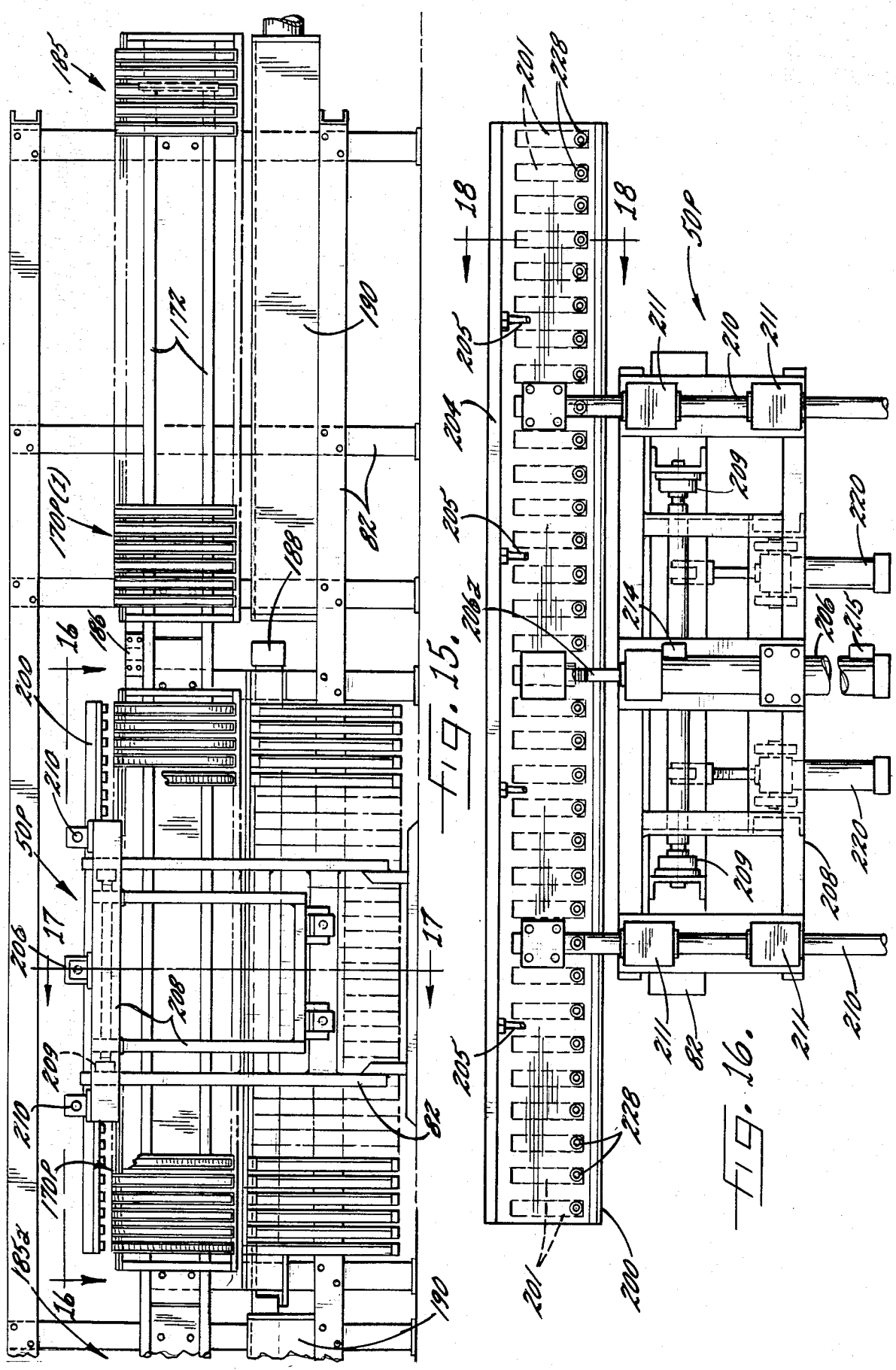

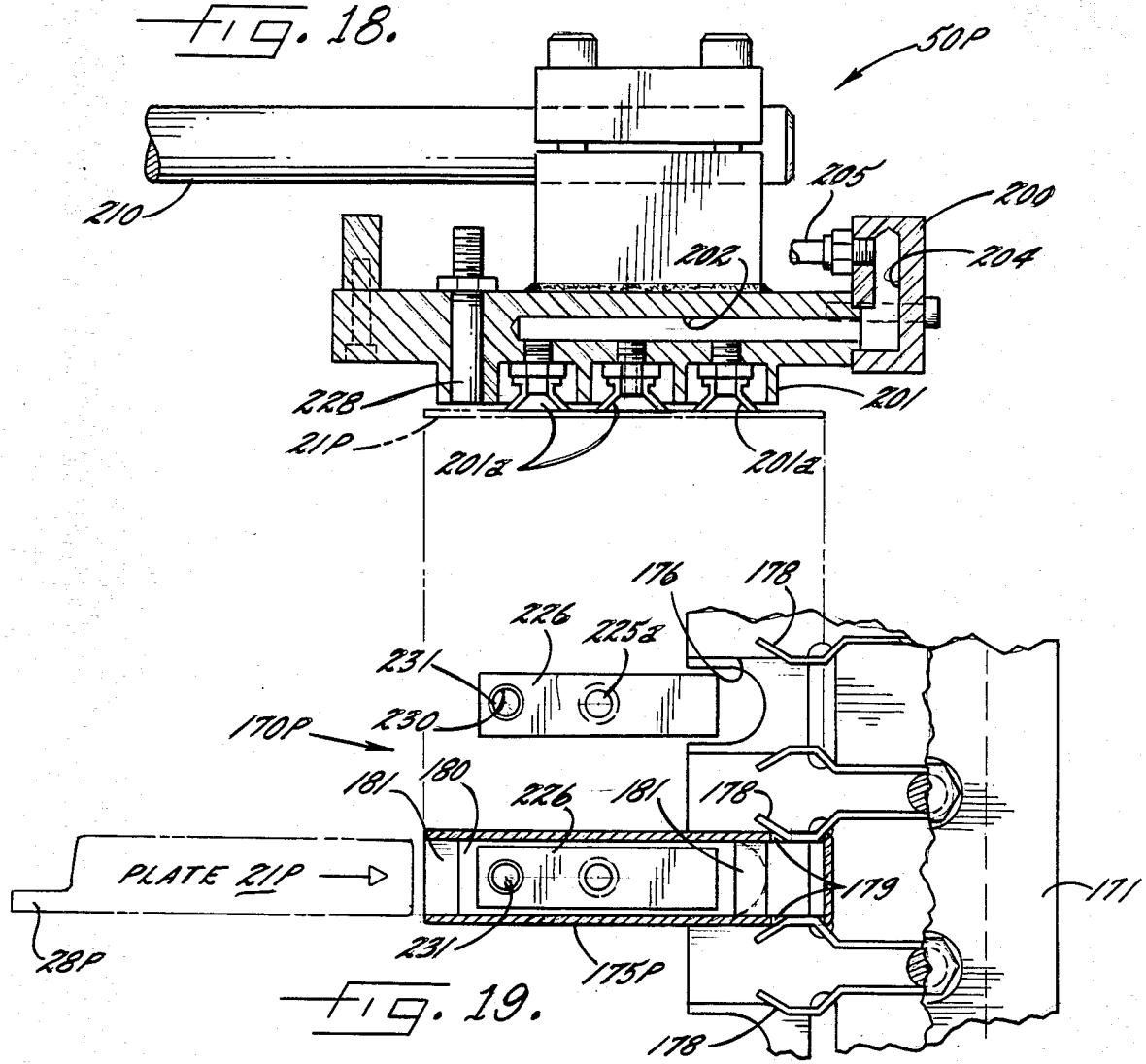
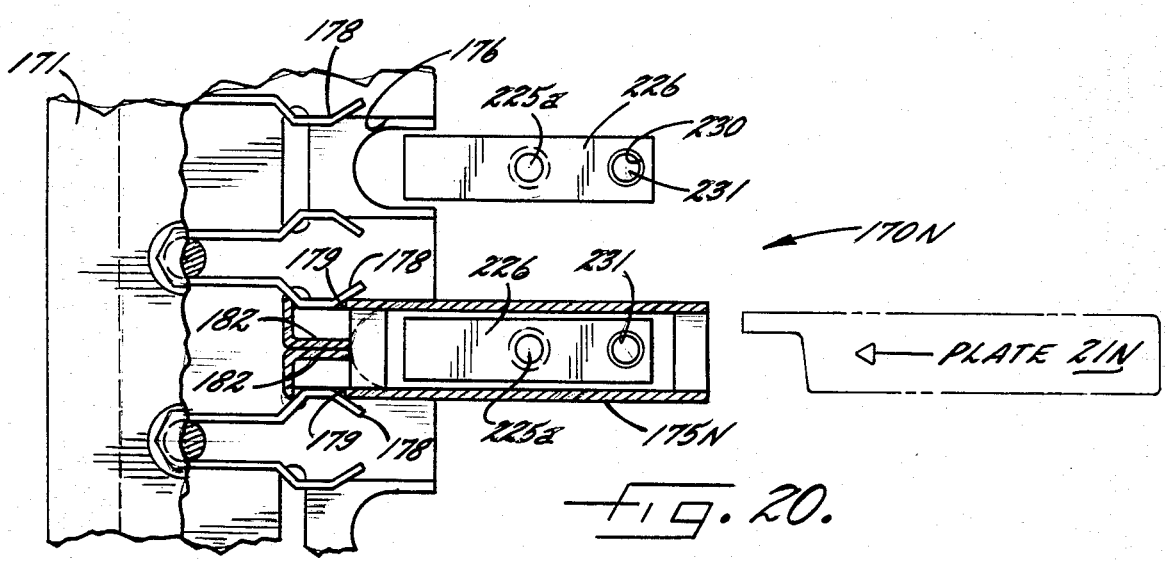

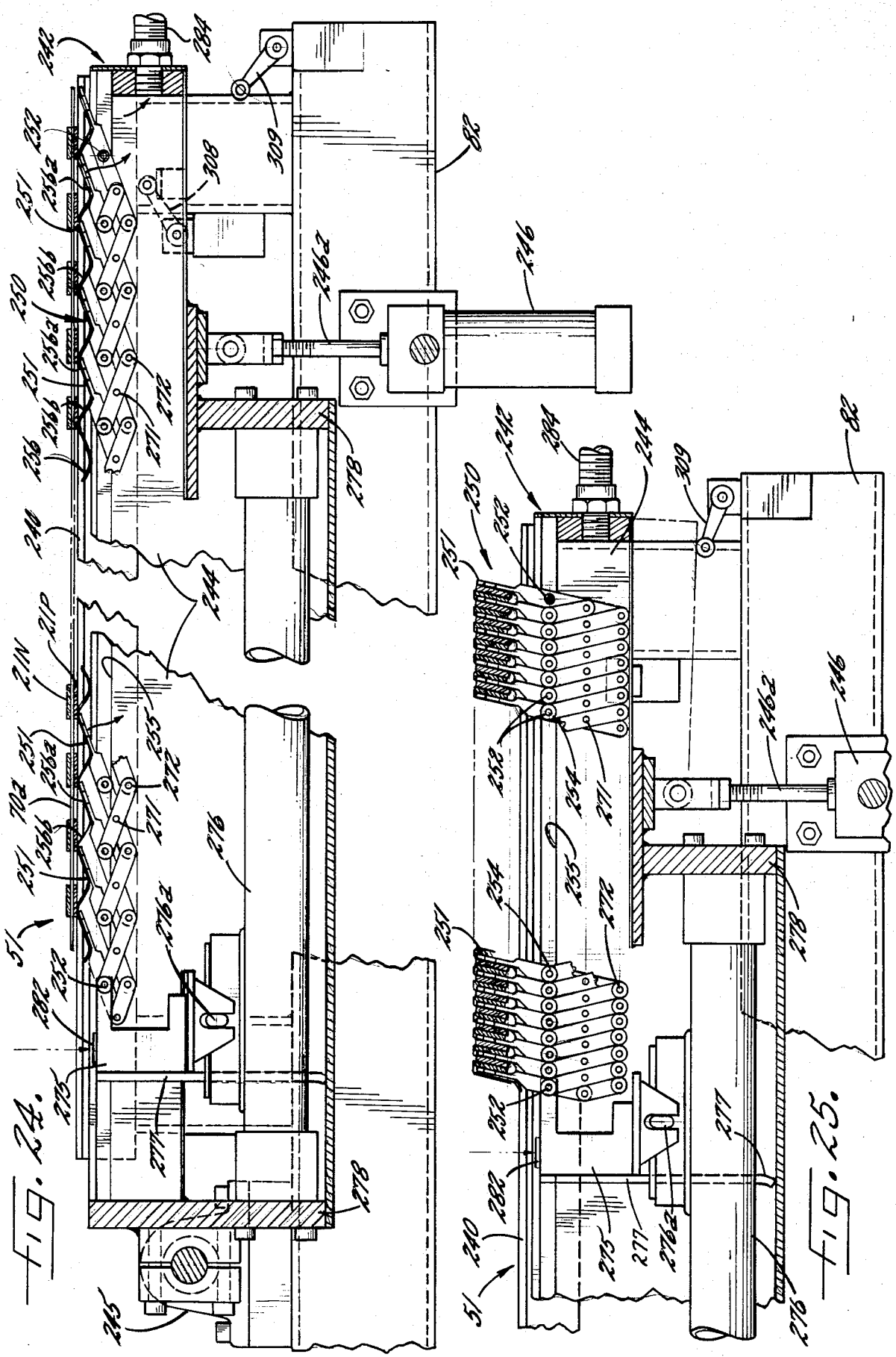

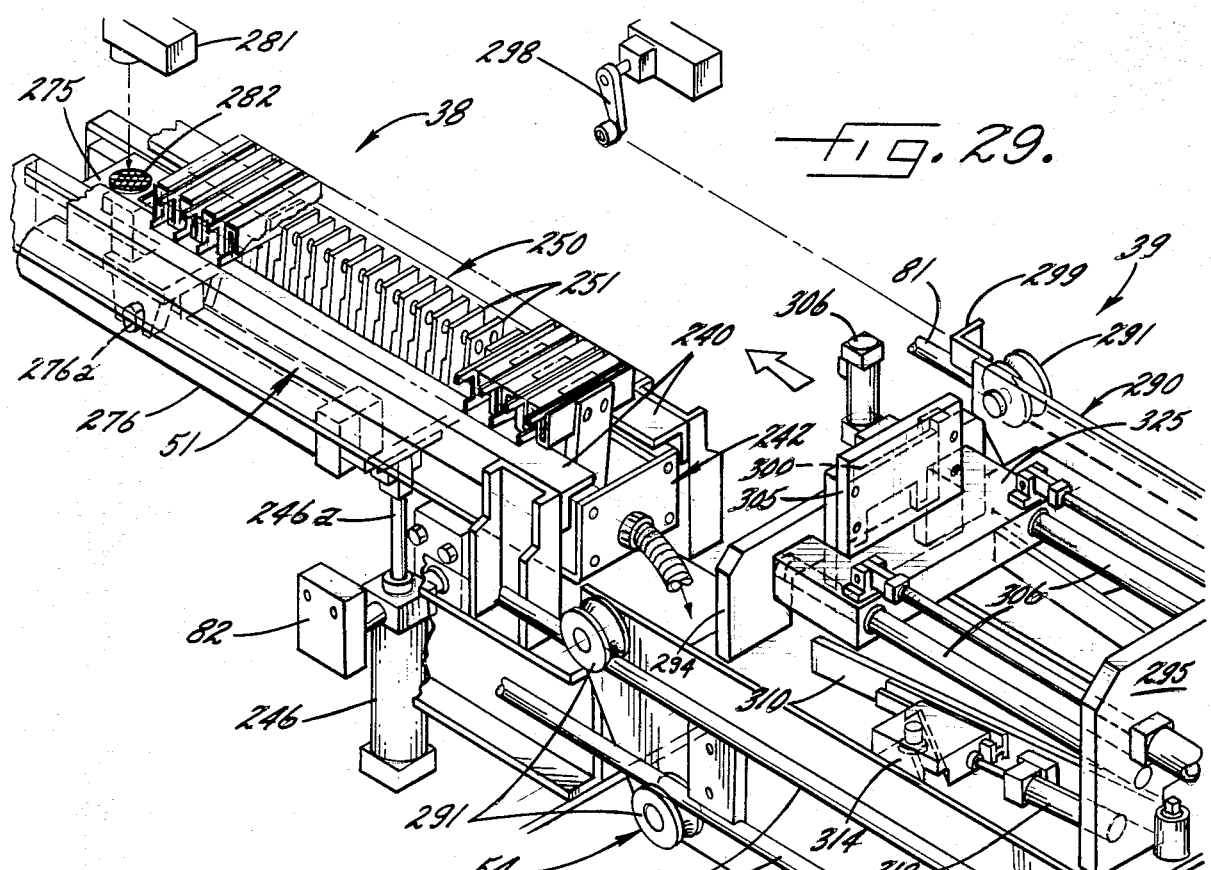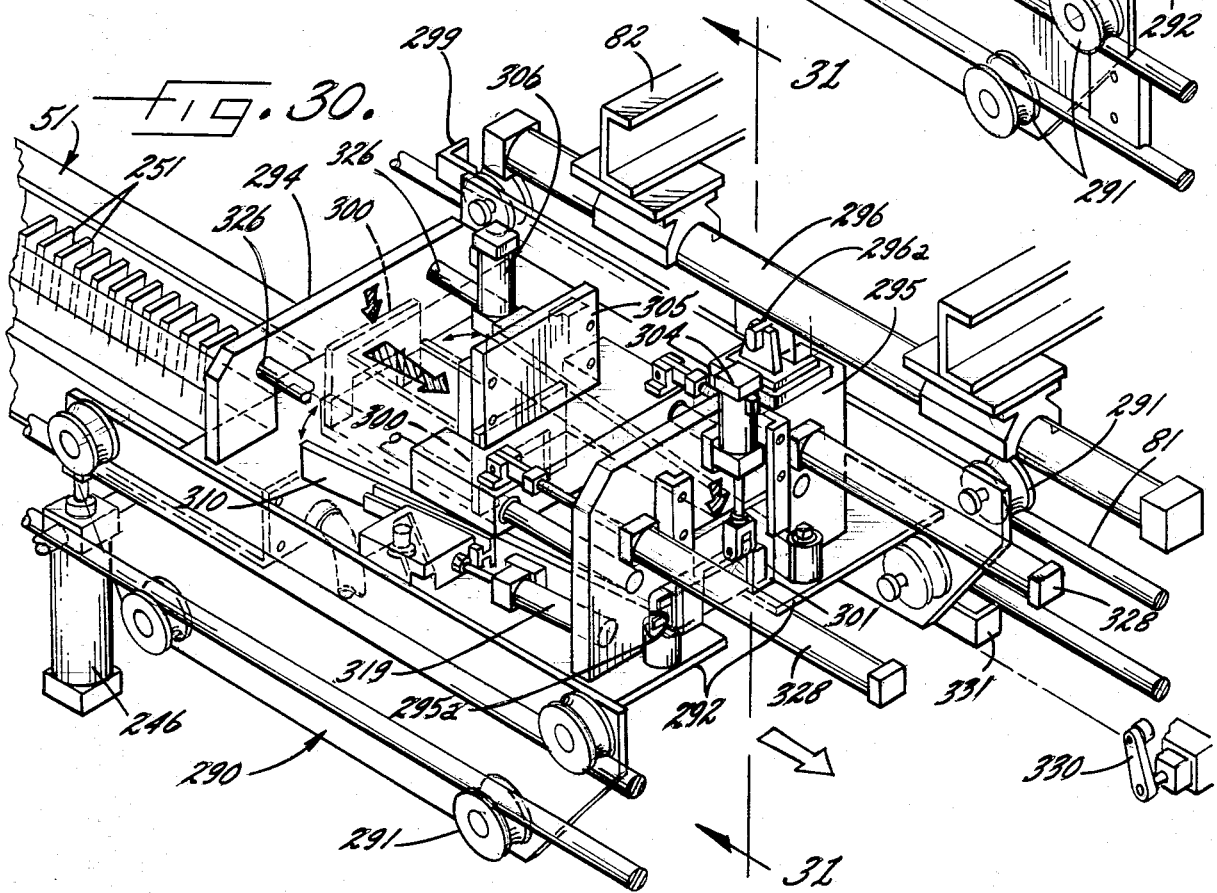

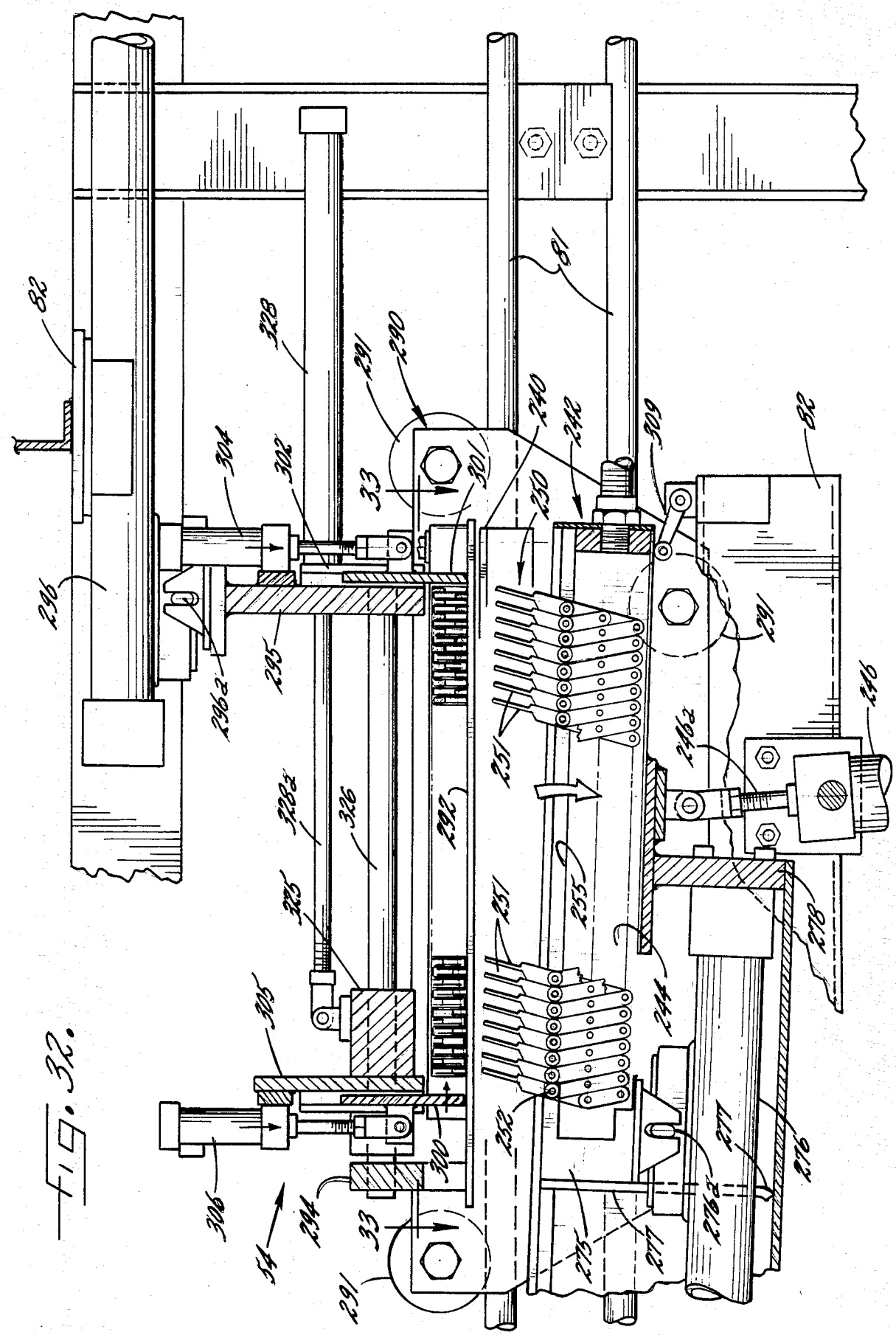

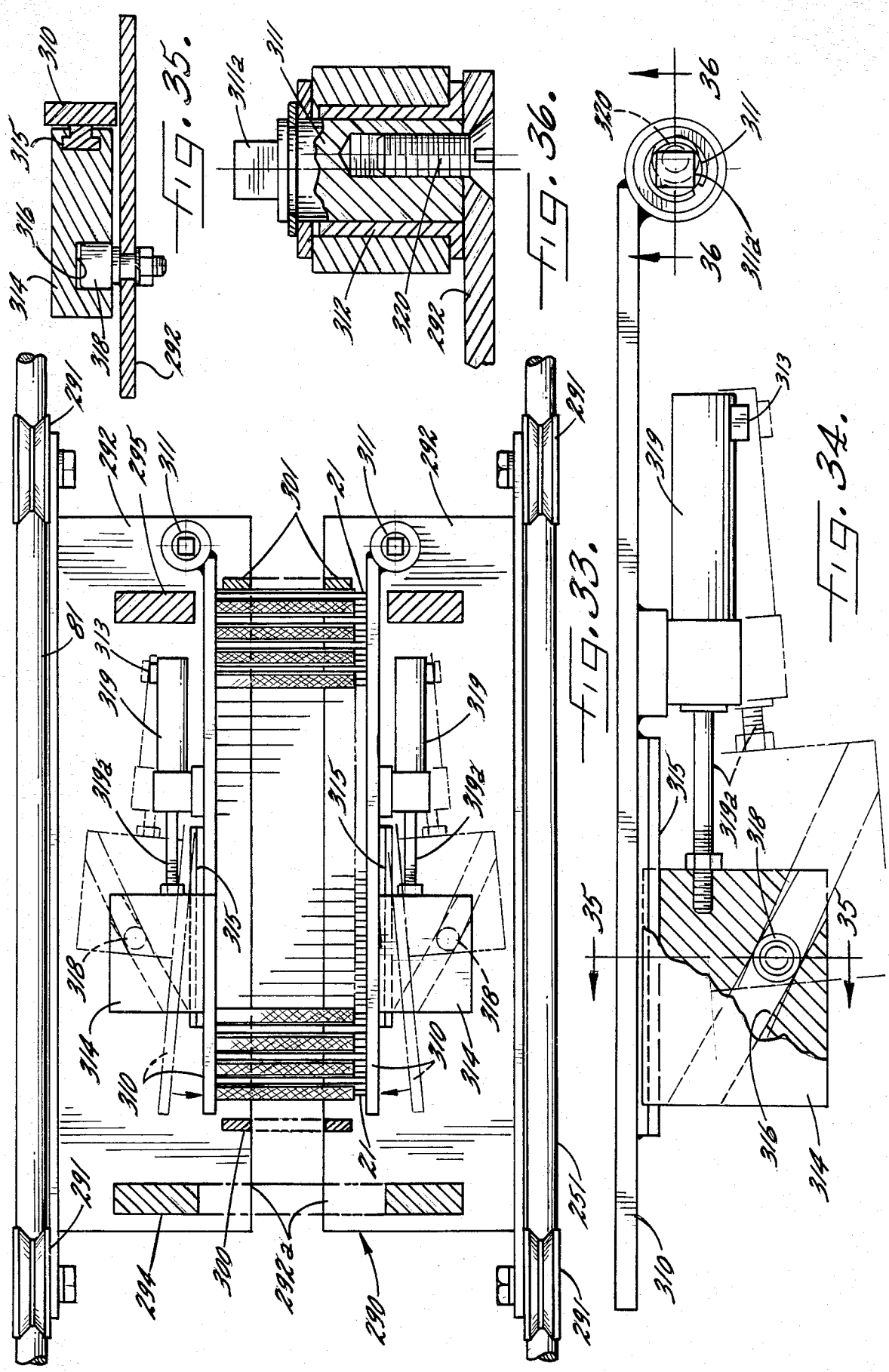

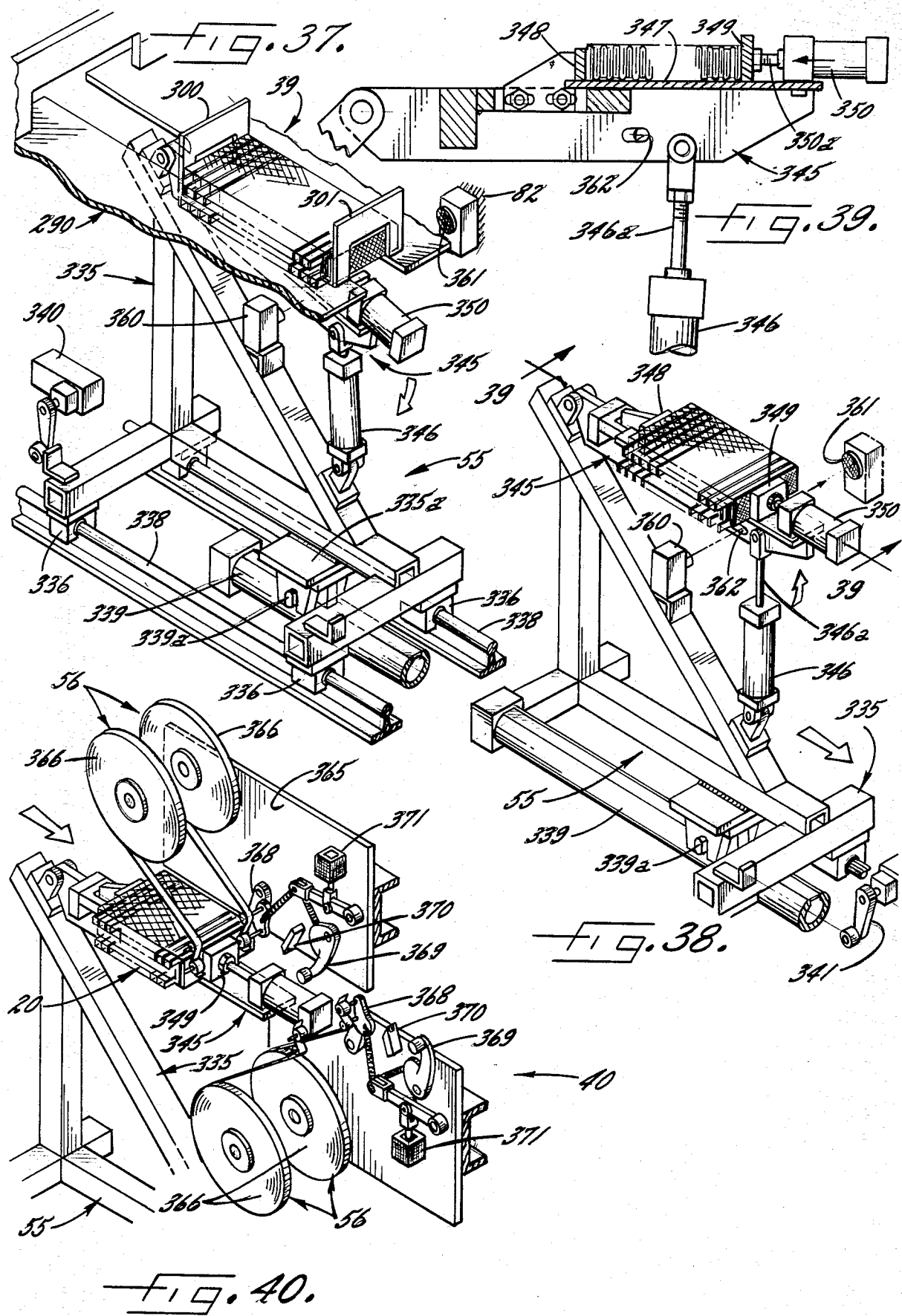

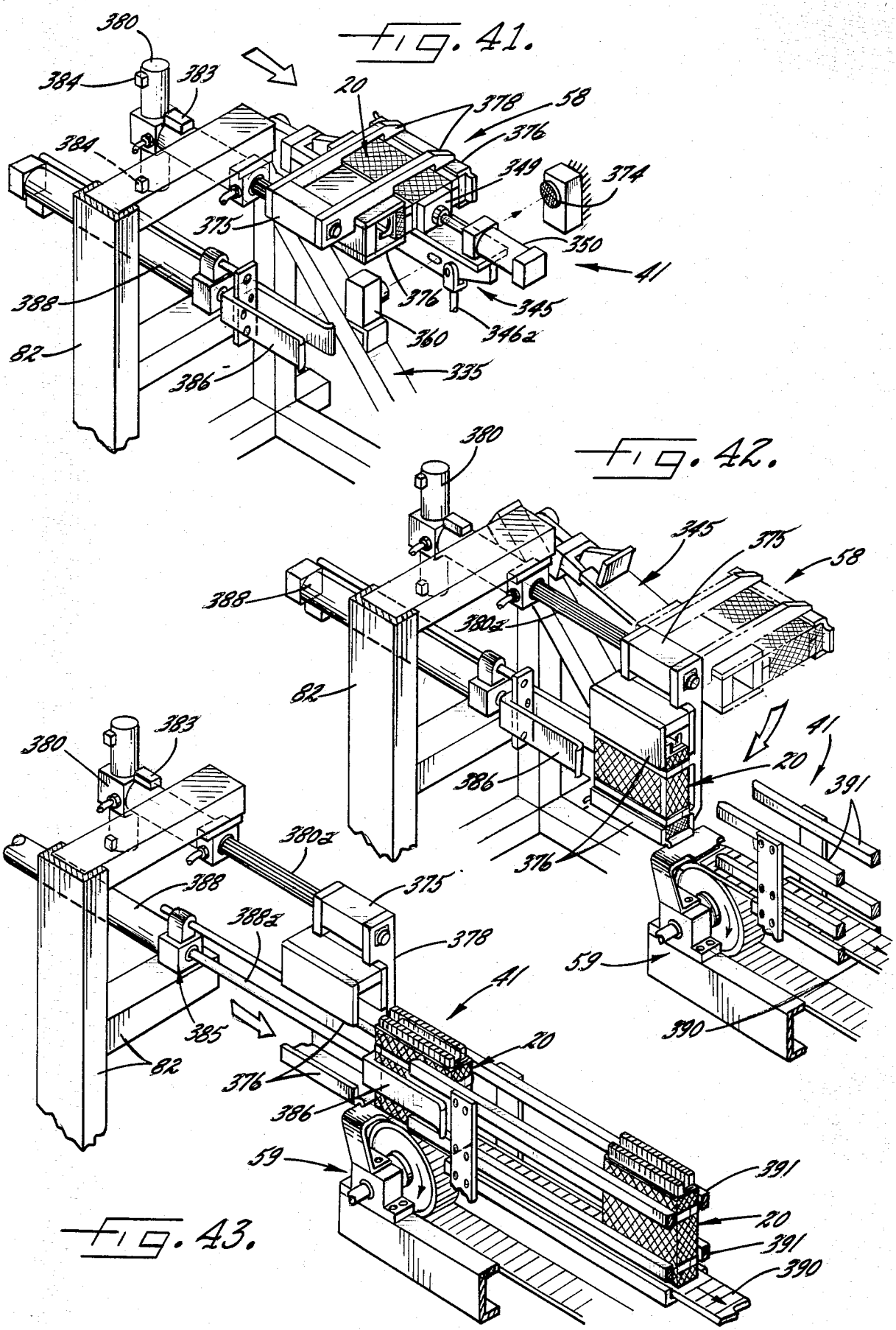

APPARATUS AND METHOD FOR ASSEMBLING BATTERY CELL ELEMENTS

RELATED APPLICATIONS

Klang and Rao, U.S. Ser. No. 352,924, filed Feb. 26, 1982, for: Lead-Acid Battery and Method of Making Same; a continuation-in-part of U.S. Ser. No. 245,772, filed Mar. 20, 1981.

Oswald and Lund, U.S. Ser. No. 245,795, filed Mar. 20, 1981, for: A Lead-Acid Battery Element Stack and Method of Making Same.

DESCRIPTION OF THE INVENTION

The present invention relates generally to lead-acid storage batteries, and more particularly, to an apparatus and method for assembling the cell elements of such batteries.

A common form of lead acid storage battery that has been commercially available for many years includes a series of cells which each comprise a plurality of relatively large, alternating positive and negative plates, usually totalling about 7 to 15 in number, which are separated by respective insulating spacers and are disposed in a battery case with the plates parallel to internal partitions of the case which define the individual cell compartments. The plates and spacers which comprise the individual cell elements commonly have been manually assembled in stacks and then positioned in the respective battery compartments with the compartment retaining the plates in their upright stacked position.

The last several years have seen a number of developments in the lead-acid battery field for starting, lighting and ignition (hereinafter "SLI") applications. Klang et al. application Ser. No. 352,924 filed Feb. 26, 1982, assigned to the same assignee as the present application, discloses a substantially maintainence-free SLI battery having improved power characteristics per unit weight or volume. The battery disclosed in the Klang et al. application has cell elements which each comprise a relatively large number of smaller plates, ranging in number up to about 72 plates per cell or perhaps more, which are separated by a continuous accordion-folded insulator sheet and are disposed in the battery compartment perpendicularly to the cell partitions.

Because of the substantially greater number of plates in each cell element and the use of an uninterrupted interleaved separator sheet, the foregoing type of SLI battery cell elements have not been amenable to high volume manual assembly, nor to other assembly techniques heretofore used in making conventional battery cell elements with relatively fewer and larger plates.

It is an object of the present invention to provide an apparatus and method for assembling battery-cell elements on a high volume production basis.

Another object is to provide an apparatus and method as characterized above which is adapted to efficiently assemble battery-cell elements comprising a relatively large number of electrode plates.

A further object is to provide an apparatus and method of the above kind for assembling battery-cell elements having a continuous, interleaved separator sheet.

Still a further object is to provide an apparatus of the above type which assembles battery-cell elements with the plates thereof in desired alignment and which permits subsequent handling of the assembled elements without substantial disturbance of such plate alignment.

Yet another object is to provide an apparatus and method of the foregoing type which may be operated automatically and on a continuous and uninterrupted basis.

Other objects and advantages of the invention will become apparent upon reading the following detailed description and upon reference to the drawings, in which:

FIG. 1 is a perspective of a lead-acid storage battery having cell elements made by the apparatus and method of the present invention;

FIG. 2 is an enlarged perspective of one of the cell elements included in the battery illustrated in FIG. 1;

FIG. 3 is an enlarged side elevational view of a typical one of the electrode plates included in the battery-cell element shown in FIG. 2;

FIG. 4 is a diagrammatic layout of a battery-cell element assembly apparatus embodying the present invention;

FIG. 5 is a perspective of a separator sheet supply station and a portion of the sheet creaser station of the illustrated apparatus;

FIG. 6 is a perspective of a separator sheet puller ready to advance a length of the separator sheet into a sheet creaser;

FIG. 7 is a perspective of the separator sheet puller after having fully advanced a length of separator sheet into the creaser;

FIG. 8 is an enlarged fragmentary section taken in the plane of line 8—8 in FIG. 5 showing the creaser and a separator sheet cutter in their retracted or open conditions;

FIG. 9 is an enlarged section, similar to FIG. 8, showing the separator sheet creaser and cutter after having been advanced to their respective creasing and cutting positions;

FIG. 10 is a perspective of a portion of a length of separator sheet following creasing and cutting by the illustrated apparatus;

FIG. 12 is an enlarged side elevational view of the separator sheet puller device taken in the plane of line 12—12 in FIG. 6;

FIG. 13 is a perspective of the creaser with a separator sheet transfer mechanism in position for removing a creased sheet;

FIG. 14 is a perspective of the plate loading and element pre-fold station of the illustrated apparatus, showing respective positive and negative plate magazines disposed on opposite sides of a pre-fold mechanism following positioning of a first set of electrode plates of one polarity onto the pre-fold mechanism;

FIG. 15 is a side elevational view of one of the plate loaders at the plate loading and pre-fold station taken in plane of line 15—15 in FIG. 14;

Figure 17:
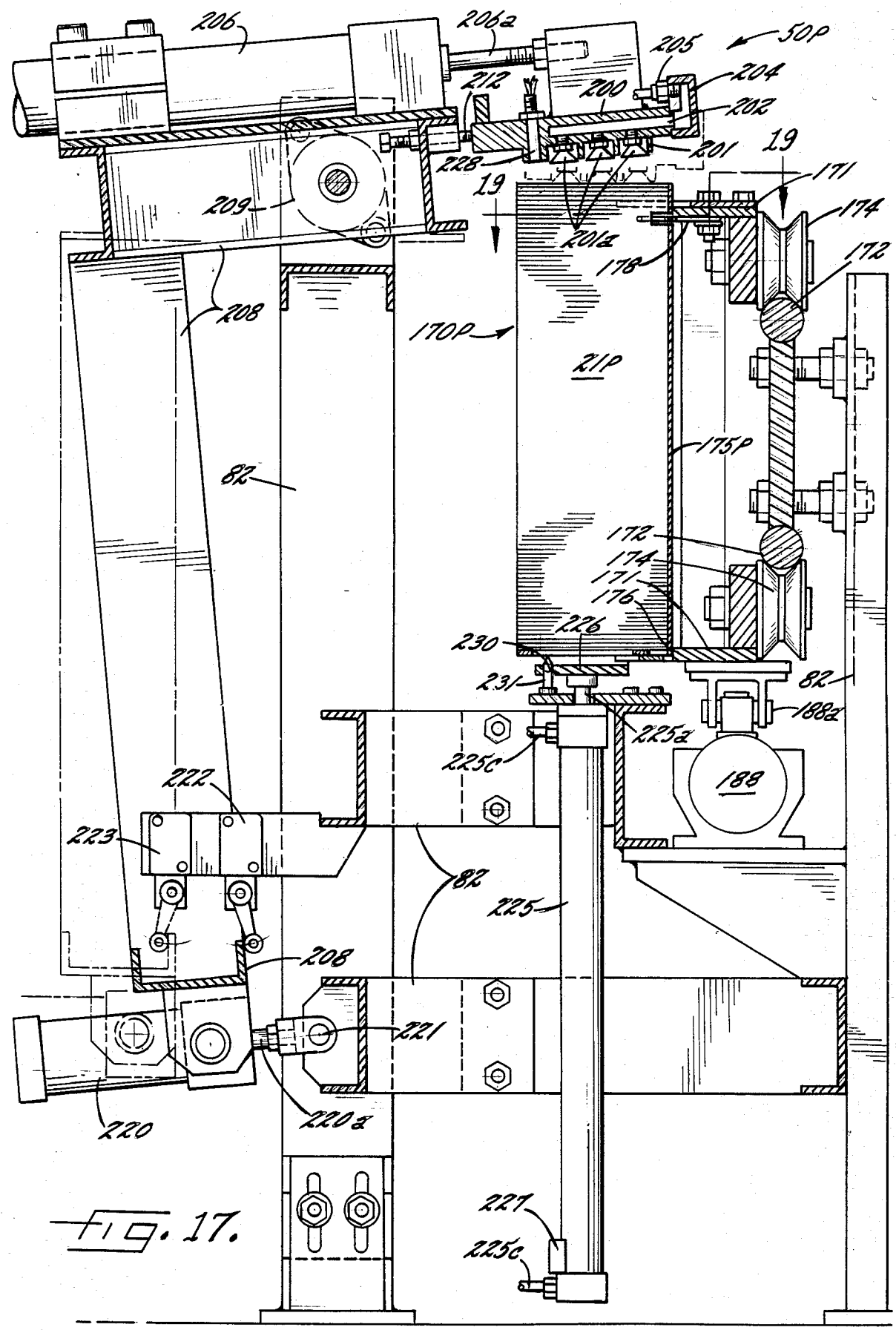
Figure 21:
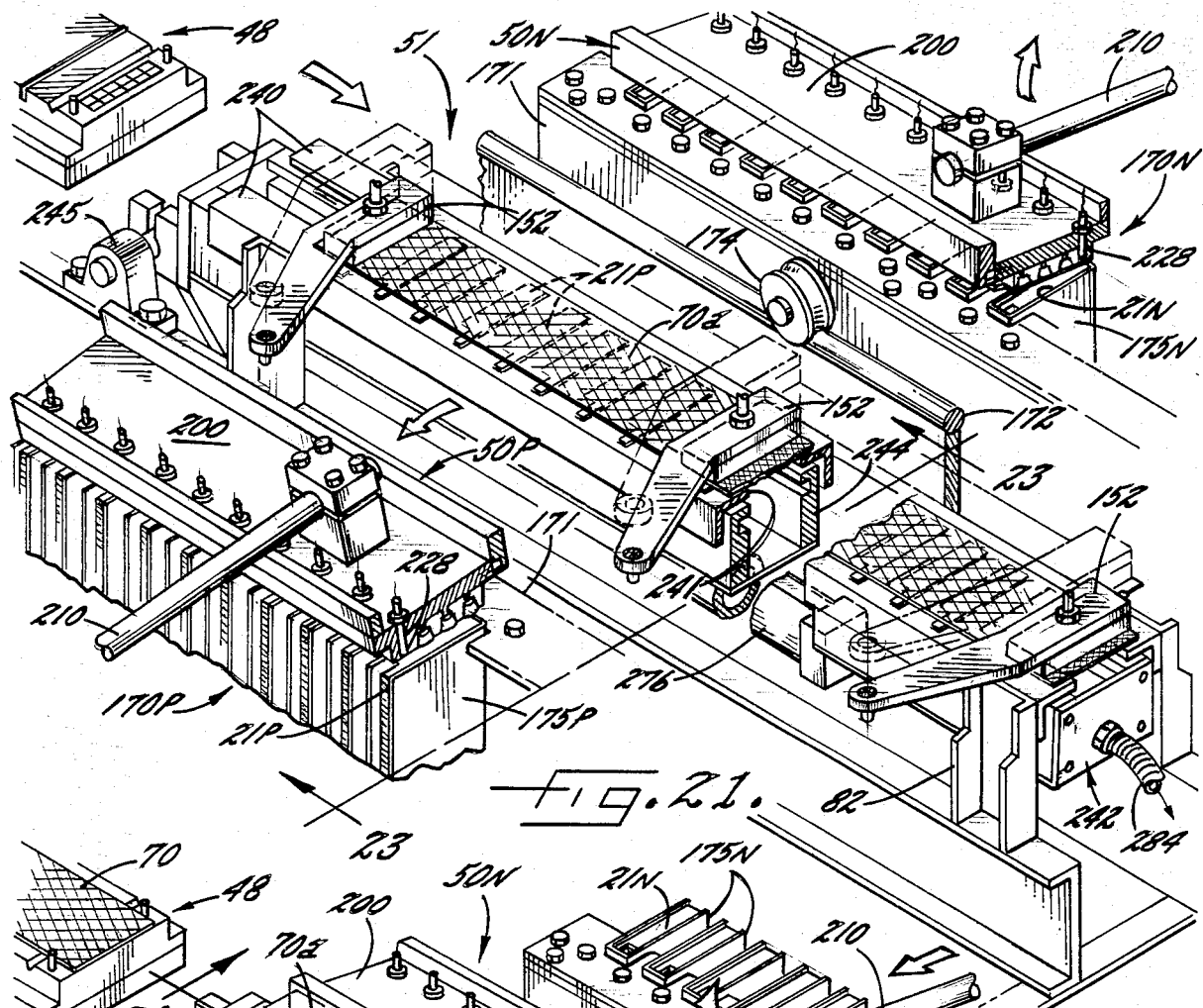
Figure 22:
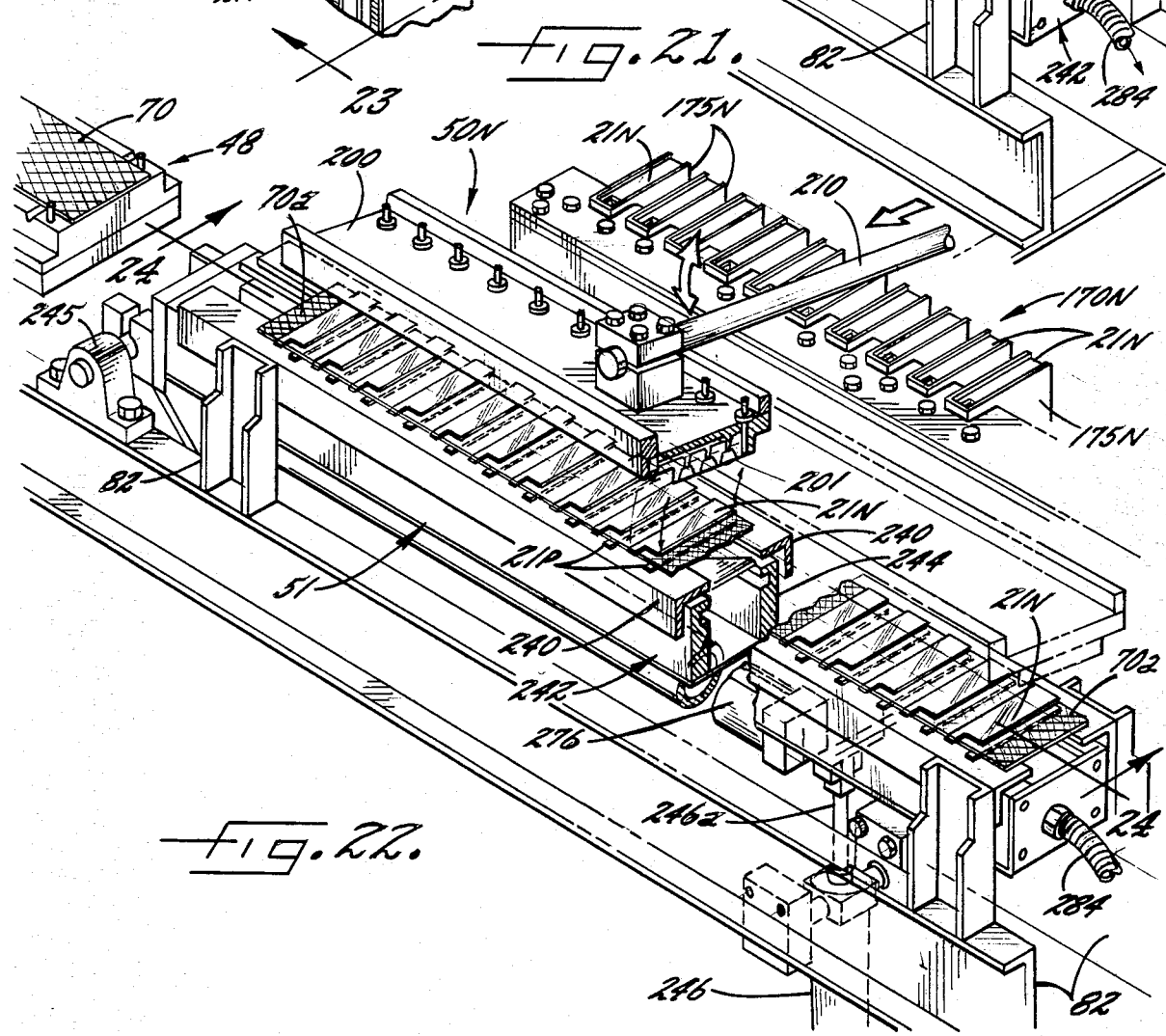
Figure 23:
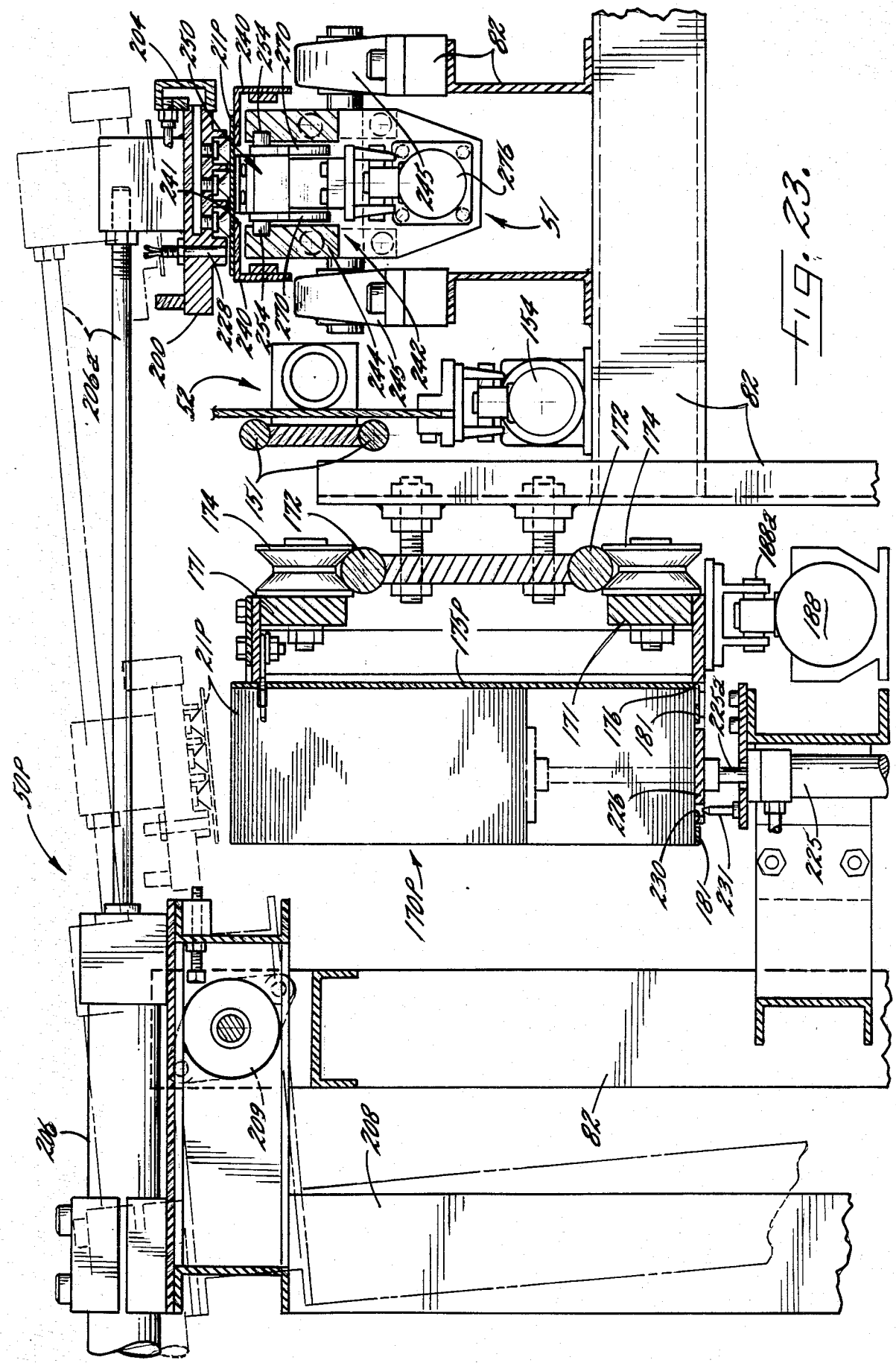
Figure 26:
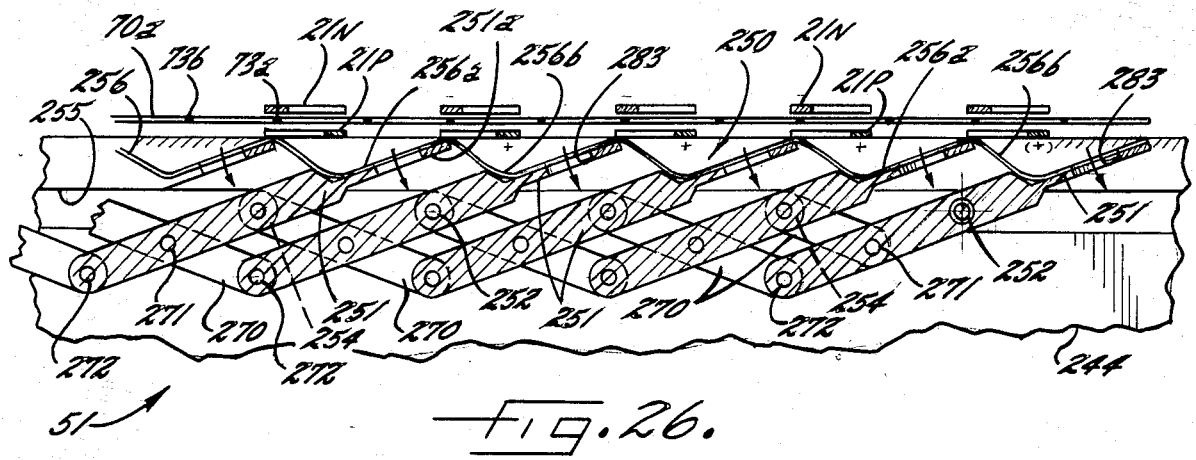
Figure 27:
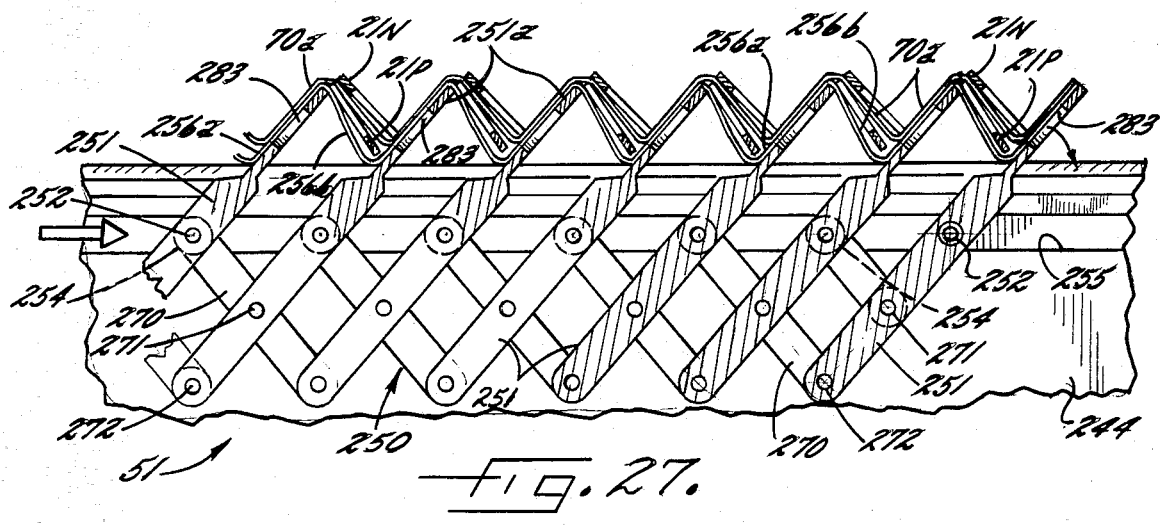
Figure 28:
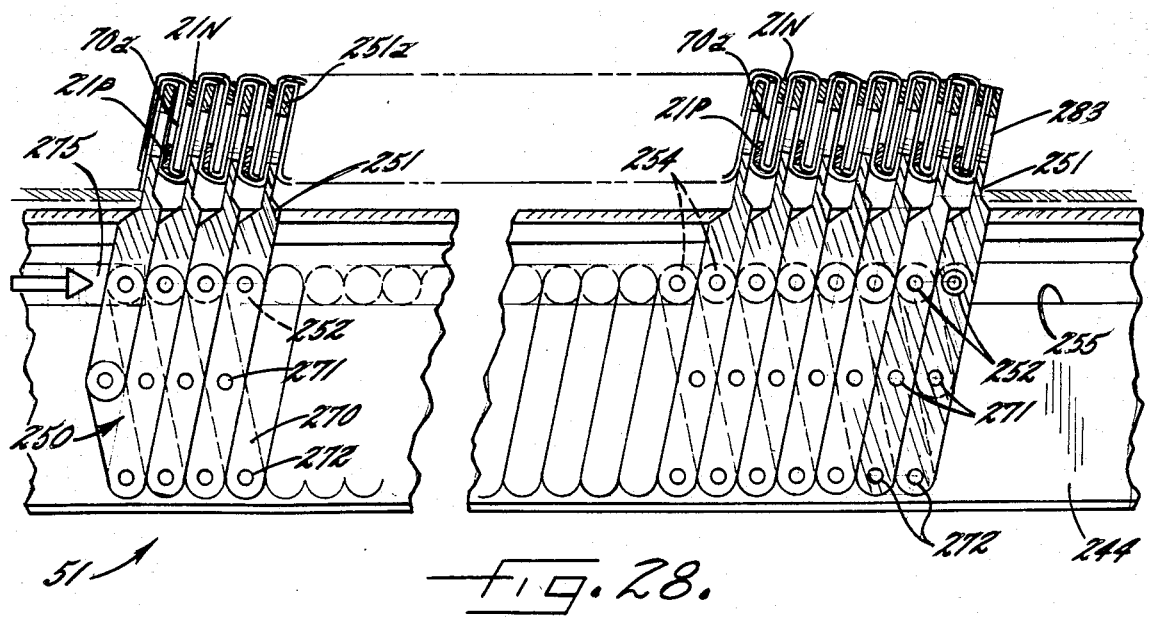
Figure 31:
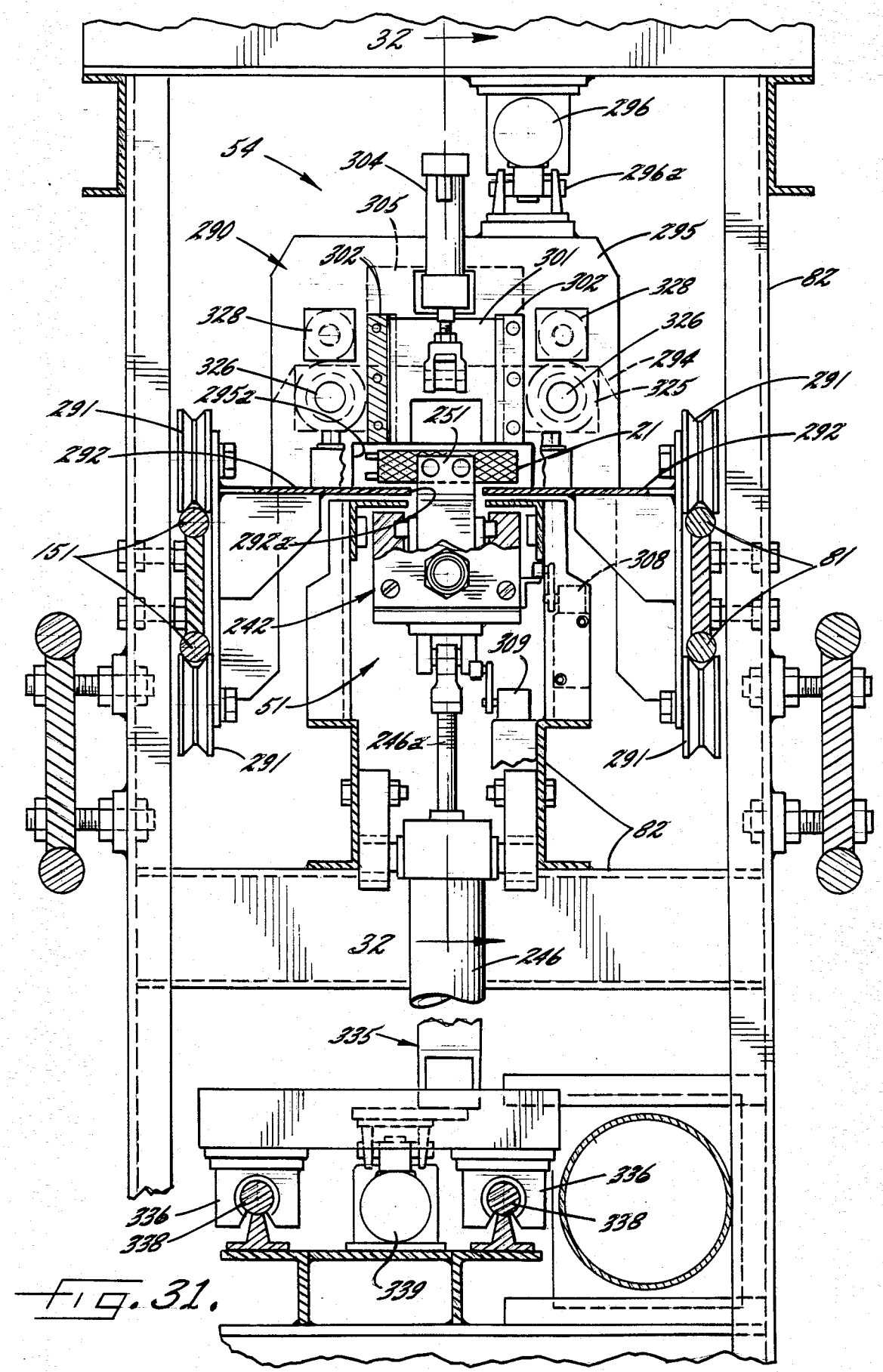
Figure 44:
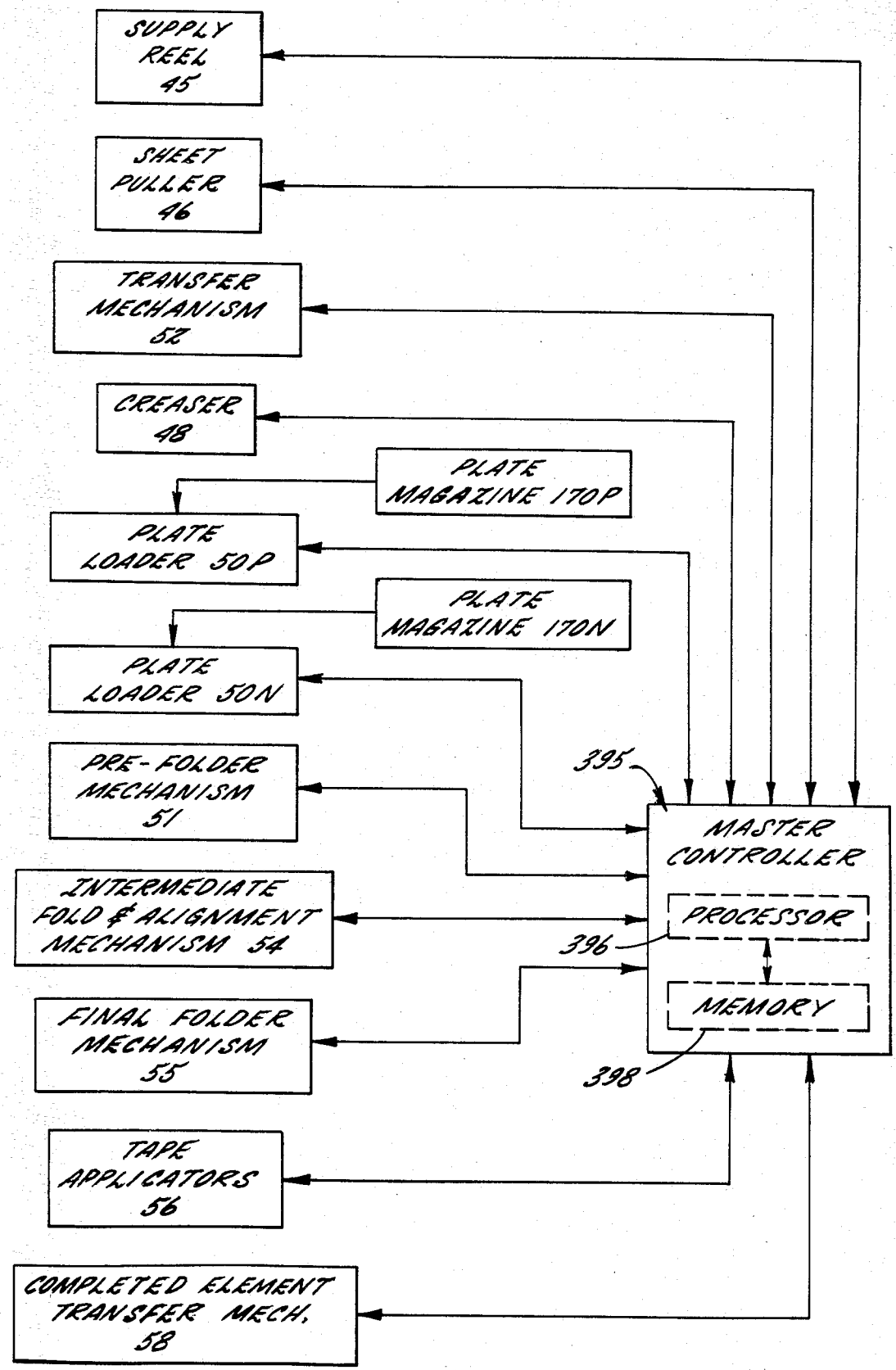

FIG. 16 a top view of one of the plate loaders shown in FIG. 15, taken in the plane of line 16—16 in FIG. 15;

FIG. 17 is an enlarged vertical section, taken in the plane of line 17—17 in FIG. 15, showing the plate loader with the head thereof positioned above an associated plate magazine prior to engaging plates therefrom;

FIG. 18 is an enlarged fragmentary section, taken in the plane of line 18—18 in FIG. 16, showing the plate loader head after having engaged plates from the plate magazine;

FIG. 19 is an enlarged horizontal section, taken in the plane of line 19—19 in FIG. 17, showing the plate magazine on one side of the pre-fold mechanism for carrying plates of one polarity;

FIG. 20 is a horizontal section, similar to FIG. 19, but showing the plate magazine on an opposite side of the pre-fold mechanism for carrying plates of the opposite polarity;

FIG. 21 is a perspective of the plate loading and pre-fold station showing the separator sheet transfer mechanism placing a pre-cut and creased length of separator sheet upon the first set of plates previously positioned on the pre-fold mechanism;

FIG. 22 is a perspective showing a second plate loader positioning a second set of electrode plates onto the separator sheet and first set of plates previously positioned on the pre-fold mechanism;

FIG. 23 is an enlarged fragmentary section, taken in the plane of line 23—23 in FIG. 21, showing the first plate loader positioning the first set of plates onto the pre-fold mechanism;

FIG. 24 is an enlarged vertical section of the pre-fold mechanism, taken in the plane of lines 24—24 in FIG. 22, showing the mechanism in its expanded, or element unfolded condition, after a first set of plates, a pre-cut and creased length of separator sheet, and a second set of plates have been positioned thereon;

FIG. 25 is a vertical section, similar to FIG. 24, but showing the pre-fold mechanism in its retracted or element pre-folding condition;

FIG. 26 is an enlarged vertical section of the right-hand end of the pre-fold mechanism illustrated in FIG. 24;

FIG. 27 is an enlarged vertical section, similar to FIG. 26, but showing the pre-fold mechanism being advanced to the retracted, or element pre-fold condition;

FIG. 28 is a vertical section, similar to FIGS. 26 and 27, but showing the mechanism in the pre-fold condition;

FIG. 29 is a perspective of an intermediate fold station of the illustrated apparatus showing an intermediate fold mechanism being advanced to engage a pre-folded element in the pre-fold mechanism;

FIG. 30 is a perspective, similar to FIG. 29, but showing the intermediate fold mechanism in its travel away from the pre-fold mechanism following removal of a pre-folded element;

FIG. 31 is an enlarged vertical section, taken in the plane of line 31—31 in FIG. 30, but showing the intermediate fold mechanism prior to engaging a pre-folded element in the pre-fold mechanism;

FIG. 32 is a vertical section, taken in the plane of line 32—32 in FIG. 31, showing the intermediate fold mechanism engaging a pre-folded element following lowering of a pre-fold paddle assembly of the pre-fold mechanism;

FIG. 33 is a horizontal section taken in the plane of line 33—33 in FIG. 32 showing the intermediate fold mechanism aligning plates of a pre-folded assembly;

FIG. 34 is an enlarged top view of one of the alignment plates of the intermediate fold mechanism shown in FIG. 33;

FIG. 35 is a vertical section taken in the plane of line 35—35 in FIG. 34;

FIG. 36 is an enlarged fragmentary section taken in the plane of line 36—36 in FIG. 34;

FIG. 37 is a partially diagrammatic perspective of a final fold mechanism of the illustrated apparatus shown in position below an intermediate folded element in the intermediate fold mechanism;

FIG. 38 is a perspective of the final fold mechanism after having finally folded the element and removed it from the intermediate fold mechanism;

FIG. 39 is a vertical section taken in the plane of line 39—39 in FIG. 38;

FIG. 40 is a perspective of the final fold mechanism carrying a finally folded element through tape applicators for securing the element in its finally assembled condition;

FIG. 41 is a perspective of a discharge station of the illustrated apparatus, showing the final fold mechanism positioning of an element in a rotary transfer device;

FIG. 42 is a perspective, similar to FIG. 41, but showing the transfer device rotating an element held therein into position for movement onto a discharge conveyor;

FIG. 43 is a perspective, similar to FIG. 42, but showing the assembled element being positioned onto the discharge conveyor; and FIG. 44 is a schematic of the master control for the illustrated apparatus.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the invention is to cover all modifications, alternative constructions and equivalents falling within the spirit and scope of the invention. Thus, while the present invention will be described in conjunction with assembling cell elements for a SLI automotive battery, it should be appreciated that the invention is equally applicable for assembling cell elements for any other lead-acid battery application. Indeed, use of the present invention will be particularly advantageous for any application in which a relatively large number of electrode plates must be combined to form a cell element.

Referring to FIG. 1, there is shown an illustrative completed battery 10 having cell elements of the type assembled by the apparatus and method of the present invention. The illustrated battery 10, which is of a type generally similar to that shown in the aforementioned Klang et al. application Ser. No. 352,924, includes a case 11 formed with a plurality of internal divider partitions 12 which form individual compartments for containing respective cells 14 of the battery. Each battery cell 14 includes a cell element 20, illustrated in FIG. 2, which comprises a plurality of positive and negative electrode plates 21 (also more specifically designated 21P and 21N) which each are separated by a continuous insulator or separator sheet 70a folded in accordion fashion with positive and negative electrode plates being alternatively positioned in folds on opposite sides of the separator sheet. For retaining the plates of each cell element 20 in such assembled condition, strips 24 of tape surround the element. Each electrode plate 21, illustrated in FIG. 3, has a relatively thin grid 25 and carries appropriate positive or negative active material 26 or its precursor. The plates 21 each have an integrally formed lug 28 (also more specifically designated 28P and 28N) located at an upper corner thereof and the lugs 28P of like polarity plates are aligned along one side of the element 20 and the lugs 28N of plates of opposite polarity are aligned on opposite sides of the element.

The plates 21 of the illustrated battery-cell element 20 have a height substantially greater than their width and are stacked in a row such that the long dimension of the element is transverse to the plane of the individual plates. The elements 20 are positioned in the respective compartments of the battery case 11 with the plates disposed perpendicularly to the cell partitions 12. To electrically couple plates of like polarity of each cell element 20, the rows of plate lugs 28 on each side of the element are joined by a respective cast lead strap 29, and as known in the art, the elements 20 of the respective cells 14 can be electrically connected in series by appropriate intercell strap connections through the partitions 12 separating the elements.

Referring now to FIG. 4, there is shown a diagrammatic layout of an illustrative element assembly apparatus embodying the present invention. The illustrated apparatus basically includes a separator sheet supply station 35, a separator sheet creaser and cutter station 36, a plate load and element pre-fold station 38, an element intermediate fold station 39, a final fold and tape applicator station 40, and a completed element discharge station 41. In operation, a continuous length of an insulating separator sheet is drawn from a supply station reel 45 by a sheet puller 46 and positioned into a creaser 48 at the succeeding station 36. Upon positioning of the separator sheet into the creaser 48, the sheet is creased at longitudinally spaced fold points and a cutter 49 severs the sheet to a determined length. A first plate loader 50P at the succeeding plate load and pre-fold station 38 simultaneously positions a first set of electrode plates of common polarity onto a pre-fold mechanism 51, after which a sheet transfer mechanism 52 transfers the cut and creased separator sheet from the creaser 48 into position over the first set of plates on the pre-fold mechanism 51 and a second plate loader 50N places a second set of electrode plates of opposite polarity onto the separator sheet. The pre-fold mechanism 51 thereupon loosely folds the plates with the separator sheet appropriately interleaved to a first predetermined length. An intermediate fold mechanism 54 at the next station 39 then engages the pre-folded element assembly, positions the plates thereof into predetermined alignment, and compresses the assembly to an intermediate or shorter length. A final fold mechanism 55 at the succeeding station 40 then engages the intermediate folded element assembly, compresses the assembly to final size, and transports it past a series of tape applicators 56 where tape is applied about the element to secure it in assembled form. A transfer device 58 at the discharge station 41 receives the assembled element and transfers it onto a discharge conveyor 59.

Referring more particularly to the separator sheet supply station 35 as shown in FIG. 5, the separator sheet supply reel 45 is rotatably mounted on upstanding support rods 65 and is selectively driven by a motor 66 through a right-angle drive transmission 68. The reel 45 holds a continuous length of a separator sheet 70, which may be of a known type, preferably being a plastic material formed with a ribbed texture so as to effectively separate and insulate adjacent electrode plates of an assembled cell element. To facilitate drawing a steady supply of the separator sheet 70 from the reel 45, the sheet is trained in a loop into a vacuum box 71 with a terminal end thereof held on a vacuum pad 72 located on the immediately adjacent end of the creaser 48. The vacuum box 71 has a perforated bottom 74 coupled to a suitable vacuum source through line 75 such that the separator sheet loop in the box is drawn downwardly by the vacuum.

As the separator sheet 70 is drawn from the vacuum box 71 during successive feed cycles to the creaser 48, the bottom of the sheet loop is raised in the box until a photoreflective cell 76 mounted in a lower portion of the box 71 senses light from a reflective plate 78 across the box. A resulting signal from the photocell 76 will cause the reel motor 66 to be energized so as to feed additional separator sheet material into the box 71. When the separator sheet 70 has been fully drawn into the creaser 48 and therefore is no longer being pulled from the vacuum box 71, the supply reel 45 under the power of its motor 66 will continue to feed additional separator sheet material into the box until the bottom of the sheet loop again interrupts the light reflective communication of the photocell 76, at which time the drive motor 66 is deenergized until the next feed cycle. The length of the separator sheet 70 looped into the vacuum box 71 preferably should be sufficiently long so that the sheet can be drawn from the vacuum box during a feed cycle without pulling forces being exerted directly on the reel 45. It will be appreciated that such a looped separator sheet supply provides an available length of the separator sheet 70 for successive feed cycles and also enables an operator to know in advance the depletion of the separator sheet from the supply reel 45.

For drawing the separator sheet 70 from the vacuum box 71 and positioning it in the creaser 48, the sheet puller 46, as shown in FIGS. 6, 7, 11 and 12, includes a carriage 80 mounted for movement on rails 81 fixed to a frame 82 (FIG. 11) of the apparatus along one side thereof. The carriage 80 in this case has pairs of vertically spaced rollers 84 on opposite sides of the rails 81 for captively holding the carriage on the rails while permitting rolling movement. To move the carriage 80 on the rails, a rodless cylinder 85 is mounted on the apparatus frame 82 immediately below the carriage. The cylinder 85, which may be of a commercially available type sold under the trade name Origa, has a piston that carries a lug 86 which in turn is coupled to a mounting plate 87 on the underside of the carriage 80. Selective actuation of the cylinder 85 will thereby drive the piston lug 86 and move the carriage 80 along the guide rails 81 between a sheet supply station end of the creaser 48 (FIG. 6) and the opposite plate load and pre-fold station end of the creaser (FIG. 7).

In order to engage and hold an end of a separator sheet 70 at the vacuum pad 72 for lifting and transport into the creaser 48, the puller carriage 80 has a pivot arm 88 with a vacuum head 89 at the end thereof. Vacuum head 89 is appropriately coupled through a vacuum manifold in the head to a suction line 90. To prevent transverse sliding movement of the end of the sheet 70 off the vacuum head as the sheet is pulled by the puller 46, the head 89 in this case includes a plurality of depending pins 91 for piercing the sheet upon engaging the sheet at the sheet supply station vacuum pad 72.

To permit selected pivotal movement of the arm 88 between a retracted travel position (shown in phantom in FIG. 6) and an extended operative position (shown in solid lines in FIG. 6), the arm 88 is mounted on an output shaft 95a (FIG. 12) of an air operated rotary actuator 95 and a proximity switch 96 is mounted on actuator 95 for sensing the extended and retracted positions of the arm. The rotary actuator 95 is fixed to a mounting block 98 (FIG. 11) supported for vertical movement on guide rods 99 held between mounting flanges 100 secured to the carriage 80 (FIGS. 6 and 7). For selectively raising and lowering the mounting block 98 and the arm 88 supported thereon, the mounting block 98 is secured to the lower end of a rod 101a (FIG. 11) of an air cylinder 101 mounted on the upper carriage flange 100.

For supplying pressurized air to the puller carriage 80 to operate the puller arm 88 and provide a vacuum pressure generating means for the head 89 thereof, a spring return air reel 102 is mounted on the apparatus frame 82 adjacent the sheet supply station end of the creaser 48 (FIG. 6). The reel 102 has an inlet 102a coupled to a suitable pressurized air source and an extensible outlet line 102b coupled to a manifold block 104 of the puller carriage 80. The outlet line 102b can be drawn out of the reel 102 upon movement of the puller carriage 80 away from the reel and is automatically rewound by the spring return of the reel upon reverse carriage movement, thereby providing a supply of pressurized air to the carriage throughout its travel on the guide rails 81. The carriage manifold 104 in turn supplies pressurized air to the puller arm lifting and lowering cylinder 101, the rotary actuator 95, and an air-operated vacuum pump 105 through respective solenoid control valves 106, 108 and 109 (FIG. 12). The outlet of the solenoid valve 109 is connected to the vacuum pump 105 through a pressure regulator 110.

For connecting the sheet puller 46 to an electrical source while located at stations at its opposite ends of its travel and for enabling a master controller for the apparatus to control the operating functions of the carriage at such stations, the puller carriage 80 has logic connectors 115, 116 mounted at its opposite ends. The carriage logic connectors 115, 116 each are engageable with a respective station logic connector 115a, 116a mounted on the apparatus frame 82 at the opposed ends of the path of travel of the puller carriage 80. Each carriage logic connector 115, 116 has a plurality of logic pins for engaging a corresponding number of logic pins carried in the station logic connector 115a, 116a. To facilitate reliable coupling of the logic connectors, the station logic connectors 115a, 116a each are carried in a mounting plate biased outwardly by springs 118.

As will become apparent, by virtue of such logic connections, when the sheet puller 46 is positioned at a separator sheet pick-up station at the supply reel end of the creaser 48 or at a sheet deposit station at the opposite end of the creaser, the master controller for the apparatus may appropriately control energization of the solenoids 106, 108, 109 and thereby control movement of the puller arm 88 and vacuum pressure to the head 89. With the control valves 106, 108, 109 appropriately actuated at one station, the sheet puller 46 may be moved along the guide rails 81 toward the other station independent of electrical or master controller connection, but with a continued air supply to the carriage 80 through the extensible reel line 102b for maintaining the puller arm in the condition as established by the master controller.

Thus, with the sheet puller carriage 80 located at the sheet supply station end of the creaser 48 and the logic connectors 115, 115a engaged, as shown in FIGS. 6 and 12, the puller arm 88 may be rotated from a raised, retracted position (shown in phantom in FIG. 6) to an outwardly pivoted position by the actuation of rotary actuator 95; the arm 88 may then be lowered by the actuation of cylinder 101 into contact with the end of the separator sheet 70 held on the vacuum pad 72 (shown in solid lines position shown in FIG. 6); and vacuum pressure may be communicated to the arm vacuum head 89 by actuation of solenoid valve 109, which together with the de-activation of vacuum pressure at the sheet supply station pad 72, permits the puller vacuum head 89 to positively engage and hold the end of the sheet. The puller arm 88 may then be raised by the reverse actuation of cylinder 101 lifting the end of the sheet 70 from the pad 72, and the carriage 80 may be moved along the rails 81 by the actuation of cylinder 85 drawing a length of the separator sheet into the creaser 48. When the puller 46 has fully drawn the separator sheet 70 into the creaser, the separator sheet will be located above vacuum pads 120, 121 at opposite ends of the creaser 48 (FIGS. 6 and 7) and the puller logic connector 116 will have engaged the station connector 116a, coupling the carriage to the master controller for the apparatus. The puller arm 88 may thereupon be lowered to position the forward end of the sheet 70 on the creaser vacuum pad 121, the puller arm vacuum head 89 de-activated, the creaser vacuum pad 121 activated to hold the end of the sheet positioned thereon, and the puller arm 88 raised and rotated to its return travel position (shown in solid lines in FIG. 7). At the same time, the vacuum pads 72, 120 at the supply station end of the creaser may be activated for firmly retaining that end of the separator sheet in position in the creaser 48.

Figure 11:
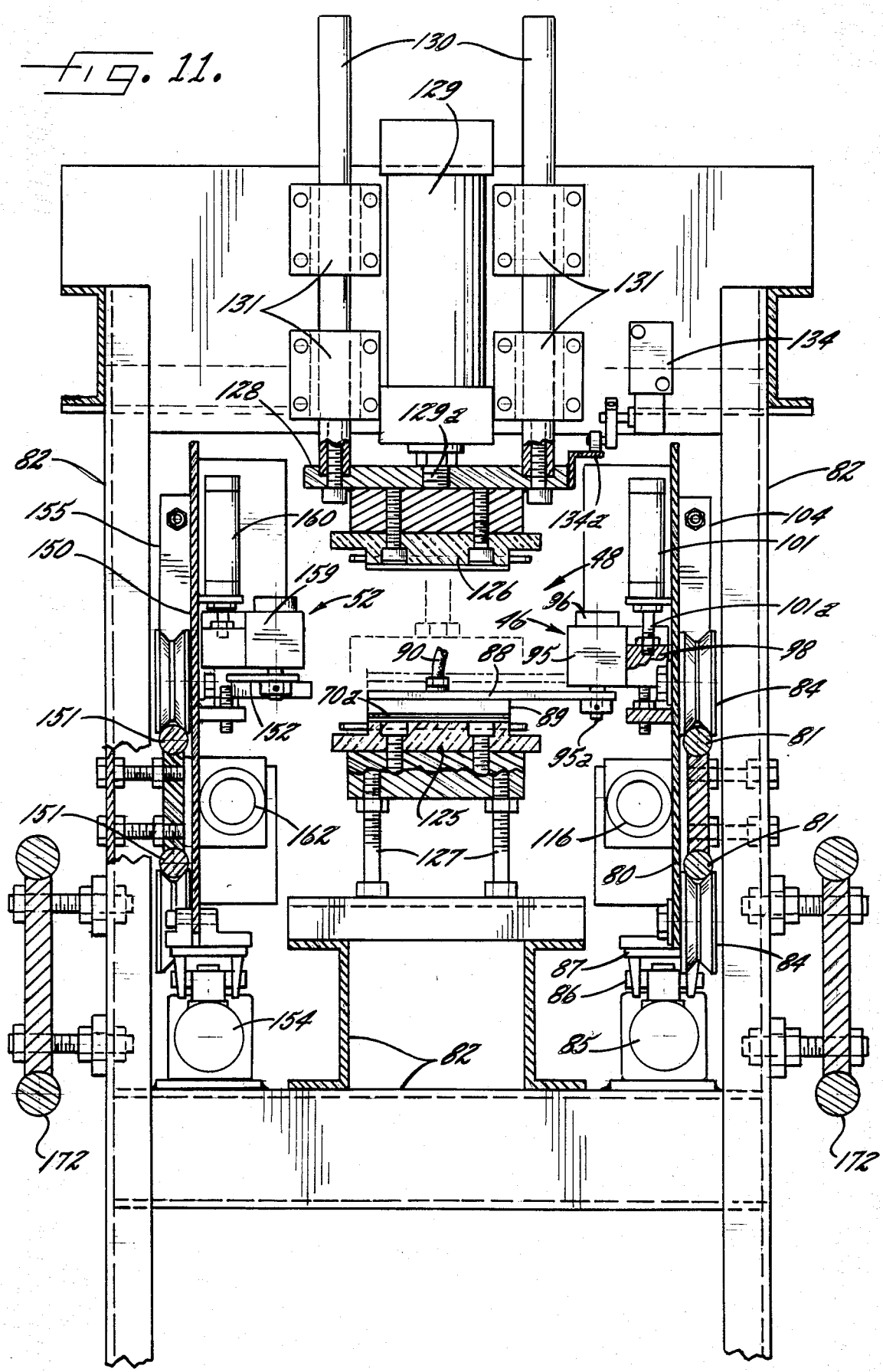
FIG. 11 is an enlarged fragmentary section of the separator sheet creasing station taken in the plane of line 11—11 in FIG. 7.

The creaser 48, as best shown in FIGS. 6, 7 and 11, includes an elongated lower stationary platen 125 and a corresponding vertically movable upper platen 126 and is adapted to form a plurality of transverse creases in the separator sheet 70 in order to facilitate subsequent folding of the sheet during the element assembly. It will be appreciated that the length of the creaser platens 125, 126 and the number of creases to be made in the sheet will be dependent upon the size and number of electrode plates to be included in an assembled cell element, with the spacing between creases corresponding substantially to the width of the plate to be folded therein.

The lower creaser platen 125 in the illustrated embodiment is mounted on the frame 82 by adjustable supports 127 for establishing a desired elevation of the platen 125. The upper platen 126 has a weighted mounting plate 128 suspended from the lower end of a rod 129a of an air cylinder 129 mounted in depending fashion from the machine frame 82. For guiding vertical movement of the upper platen 126, the mounting plate 128 has a pair of upstanding guide rods 130 disposed on each side of the cylinder 129 which are mounted in bearings 131 for relative sliding movement. Guide members 132 also extend upwardly through the frame 82 from opposite outer ends of the upper platen 126. Actuation of the cylinder 129 will lift the upper platen 126 to a raised position, shown in solid lines in FIG. 11, and de-actuation of the cylinder 129 permits the platen 126 to be lowered under its own weight to a sheet creasing position, shown in phantom in FIG. 11. For sensing the raised and lowered positions of the upper platen 126, respective limit switches 134, 136 are mounted on the frame 82 which are engagable by respective switch stops 134a, 136a on the platen.

For forming the sheet creases, the platens 125, 126 each carry a one-piece serpentine configured creasing bar 138 formed with a plurality of transversely disposed raised creaser sections 138a. The creaser bar sections 138a of the respective platens are disposed in offset relation such that the creaser sections 138a of one platen are located midway between bar sections 138a of the opposite platen, and each platen is formed with a series of transverse grooves 140 for receiving the creaser bar sections 138a of the opposite platen upon lowering of the platen 126 into creasing position. The creaser bar sections 138a each preferably are formed with a V-shaped creasing edge and the receiving groove in the opposed platen is formed with a similar, but larger, V-groove, as shown in FIGS. 8 and 9.

To facilitate formation of the creases, the creasing bars 138 of each platen 125, 126 are electrically heatable. To this end, the creasing bars 138 are electrically coupled together at one end by a line 141 sufficiently long to permit relative movement of the platens (FIG. 7), while the opposite ends of the platens have terminals coupled to a suitable electrical source which permits current to be conducted in series through the two one-piece bar configurations heating the bars 138 by the electrical resistance of the bars themselves. The platens 125, 126 in this instance are made of electrically non-conductive material, such as linen phenolic, and the creasing bars 138 are made of an electrically conductive material, such as stainless steel, which has an electrical resistivity sufficient to create the desired heating effect.

It can be seen, therefore, that when the upper platen 126 is lowered to the creasing position shown in FIG. 9 with the creasing bars 138 appropriately heated the sheet 70 will be forced by the bars 138 into the grooves 140 of the opposed platen and by virtue of the localized heating by the bars 138 will plasticly conform to the V-configuration of the groove, such that upon lifting of the upper platen 126 and the plastic separator sheet 70 retains distinct transverse V-creases 73a, 73b, as shown in FIG. 10, with alternating creases being oppositely directed. To prevent shorting of the current conducting creasing bars 138 during creasing, end portions 138b of the bars connecting the transverse creasing sections 138a preferably have a reduced height so as to be disposed below the surface of the respective platen.

With the upper creaser platen 126 lowered to its creasing position, provision is made for cutting the sheet 70 to the desired length for subsequent handling and use in the element assembly. For this purpose, the sheet cutter 49 is mounted within a recess 146 between the vacuum pads 72, 120 of the lower platen 125 adjacent the sheet supply station end thereof. As shown in FIGS. 8 and 9, the cutter 49 includes a transversely disposed high resistance, electrically heatable wire 145 supported at the end of a rod 148a of an upstanding air cylinder 148. The wire 145 is coupled to a suitable electrical source for maintaining it at a desired cutting temperature and is appropriately insulated from the cylinder rod 148a upon which it is supported. Following lowering of the upper platen 126 to the sheet creasing position, the air cylinder 148 can be actuated to move the cutting wire 145 from its normal retracted position below the surface of the lower platen 125 (FIG. 8) to a raised position severing the plastic sheet 70 held between the platens (FIG. 9) to a discrete predetermined length 70a. A magnetic switch 149 mounted on the cylinder senses the position of the cylinder piston, and thus, the raised and retracted positions of the cutter 49.

Following such creasing and cutting of the separator sheet, the upper platen 126 is raised by actuation of the cylinder 129 to permit removal of the cut and creased sheet 70a from the creaser 48 by the sheet transfer mechanism 52. The sheet transfer mechanism includes a carriage 150 mounted on rails 151 on the side of the apparatus opposite the sheet puller 46 for movement between a position adjacent the creaser 48 (FIG. 13) and a position adjacent the pre-fold mechanism 51 (FIG. 21). The sheet transfer mechanism 52 is similar to the puller 46 except that it has a longer length, corresponding to the length of the cut separator sheet 70a to be transferred, and has four transfer arms 152 positioned along the length thereof. Like the puller carriage 80, the transfer mechanism carriage 150 is moved by a rodless cylinder 154 mounted below the carriage and carries an air manifold 155 supplied by pressurized air from an extensible line 156b of a spring returned air reel 156. The air manifold 155 in this instance provides air to operate each of the four transfer arms 152 through similar appropriate solenoid control valves. The transfer arms 152 each have a suction head 158 and are pivoted between retracted travel positions and extended operative positions by operation of respective air operated rotary actuators 159 and are raised and lowered by actuation of respective air cylinders 160. In this instance, the two transfer arms 152 at one end of the transfer mechanism 52 are pivoted to their travel positions in a direction toward their respective end of the transfer mechanism while the two transfer arms at the opposite end are pivoted in an opposite direction to their travel positions. The transfer mechanism carriage 150, again like the puller carriage 80, carries logic connectors 161, 162 at its opposite ends for engaging respective station logic connections when located at the creasing station 36 or the plate load and pre-fold station 38.

With the transfer mechanism arms 152 in their retracted travel positions, it will be appreciated that the transfer mechanism 52 can be moved to the creaser station during a creasing operation such that upon completion of creasing and cutting of a separator sheet 70a and raising of the upper creaser platen 126, the transfer mechanism arms 152 may be pivoted to their extended positions, lowered into sheet engagement, and the suction head pressure activated. Vacuum pressure at the creaser pads 120, 121 is then de-activated, permitting the transfer mechanism 52 to lift the cut and creased sheet from the lower creaser platen 125 and transfer it to the pre-fold mechanism 51. Upon removal of the sheet from the creaser, a fiber-optic photo eye 164 mounted in the upper platen 126 makes light contact with a receiver 164a mounted in the lower platen (FIG. 5) transmitting a signal to indicate that the sheet has been removed.

The plate load and pre-fold station 38, as best shown in FIGS. 14-17 and 21-23, includes the pre-fold mechanism 51 located adjacent the downstream end of the creaser 48, a first plate magazine 170P disposed on one side of the pre-fold mechanism 51 for holding a supply of electrode plates 21P of one polarity, a second plate magazine 170N disposed on the opposite side of the pre-fold mechanism 51 for holding a supply of electrode plates 21N of opposite polarity, and first and second plate loaders 50P, 50N located adjacent the respective first and second plate magazines 170P, 170N. Each plate magazine 170P, 170N has a channel frame 171 supported on respective rails 172 by rollers 174. The support rails 172 for the magazine 170P are mounted on the apparatus frame 82 outwardly of the guide rails 151 for the sheet transfer mechanism 52 (FIGS. 11 and 23) and the rails 172 for the magazine 170N are similarly mounted on the opposite side of the pre-fold mechanism 51 outwardly of the rails 81 for the sheet puller 46 (FIG. 11). Each magazine assembly 170P, 170N includes a plurality of electrode plate cartridges 175P, 175N corresponding in number to the plates of each polarity that are to be included in the assembled element. The magazine plate cartridges 175P, 175N each have a lower end positioned in a seat 176 in the channel frame 171 and an upper end releasably secured to the frame 171 by U-shaped springs 178 having legs outwardly biased into slots 179 formed in the adjacent cartridges, as shown in FIGS. 19 and 20.

The illustrated cartridges 175P, 175N each have an open top, upstanding channel-shaped construction for holding a vertical stack of similarly oriented electrode plates. The illustrated cartridges each have a rectangular opening 180 in the bottom thereof and support the stack of plates upon two transversely spaced cross straps 181 at opposite ends of the opening. For reasons which will become apparent, the cartridges 175P for the magazine 170P carry the plates 21P with the lugs thereof directed outwardly of the magazine, while the cartridges 175N for the magazine 170N carry the plates 21N with lugs directed inwardly into the cartridge. The cartridges 175N in this instance are formed with inwardly directed flanges 182 that define a compartment for receiving the lugs 28N of the plates 21N, as shown in FIG. 20. It will be appreciated that the cartridges 175P, 175N may be removed from their respective frame 171 for reloading at a remote location and then be snapped back into the magazine frame, or alternatively, the cartridges may be reloaded with plates while mounted on the frame.

In order to maintain a ready supply of electrode plates for use at the pre-fold mechanism 51, in the illustrated embodiment a second or auxiliary magazine is mounted immediately to one side of the respective magazines 170P, 170N in use at the pre-fold mechanism. As shown in FIGS. 14 and 15, an auxiliary magazine 170P(1) is mounted on the rails 172 at a magazine load station 185 immediately to the right of the magazine 170P, as viewed in the figures. As the magazine 170P at the pre-fold mechanism 51 supplies plates for use in the element assembly operation, the auxiliary magazine 170P(1) may be loaded with plates. Upon depletion of plates from the magazine 170P, provision is made for moving the magazines 170P to reload station 185a to the left of the pre-hold mechanism 51, as viewed in FIG. 15, while simultaneously moving the auxiliary pre-loaded magazine 170P(1) into position for supplying plates to the pre-load mechanism 51. For this purpose, the adjacent magazines 170P, 170P(1) are connected together by a coupling 186 and are movable on the support rails 172 by a rodless cylinder 188 mounted immediately below the magazine 170P, 170P(1) with its piston lug 188a coupled to the frame 171 of one of the magazines, as shown in FIG. 17. It is understood that the magazine 170N on the opposite side of the pre-fold mechanism 51 has a similar auxiliary magazine, although not shown. Because lead oxide dust and other particles may be dropped from the electrode plates upon loading into the magazines at the reload stations 185, 185a, a vacuum plenum 190 is mounted below each magazine reload station for collecting such dust and particles. The vacuum plenums 190 preferably are coupled to a central filter system for removing the contaminants from the air prior to recirculation into the atmosphere.

For transferring sets of plates from the respective magazines 170P, 170N onto the pre-fold mechanism 51, each plate loader 50P, 50N has a transfer head 200 that is movable from a retracted position over its respective magazine (FIG. 17) to an extended position over the pre-fold mechanism 51 (FIG. 23). Each plate loader head 200, as best shown in FIG. 18, has a plurality of vacuum pads 201, corresponding in number to the magazine cartridges from which plates are to be received. Each vacuum pad 201 in the illustrated embodiment has three suction cups 201a coupled to a common port 202 which in turn is connected to a vacuum manifold 204 extending the entire length of the head 200. A plurality of suction lines 205 (FIG. 16) in this case couple the manifold 204 to a vacuum pressure source.

Each plate transfer head 200 is carried at the end of a rod 206a of a double actuating air cylinder 206 mounted on an L-shaped pivot frame 208 (FIG. 17). The pivot frame 208 in turn is pivotably supported on the apparatus frame 82 in bearings 209. The plate transfer head 200 may be moved between its retracted and extended positions by appropriate actuation of the air cylinder 206, and head guide rods 210 extending rearwardly from opposite ends of the head 200 are supported in bearings 211 for guiding such extended and retracted head movement. To permit selective adjustment in the retracted position of the plate transfer head 200, an adjustable stop 212 is mounted on the pivot frame 208 for engaging the head 200 upon retraction. Magnetic switches 214, 215 mounted on the cylinder 206 sense the respective extended and retracted positions of the plate transfer head 200.

For lowering the plate transfer head 200 to a plate receiving position while in its retracted position over the associated magazine (shown in phantom in FIG. 17) or to a lowered plate depositing position when extended over the pre-fold mechanism 51 (FIG. 23), air cylinders 220 are carried at the lower end of the L-shaped pivot frame 208 and have rods 220a pivotably coupled at 221 to the apparatus frame 82. It will be seen that by the selected actuation of the air cylinder 220 the cylinder rod 220a can be extended or retracted to pivot the L-frame 208 and thereby raise and lower the plate transfer head 200 supported thereon. Limit switches 222,223 mounted on the frame 82 (FIG. 17) sense the respective raised and lowered plate transfer head positions.

In order to continuously raise the stacks of electrode plates 21 in the cartridges 175P, 175N of each magazine 170P, 170N so that the top plate in each cartridge is in position for engagement by the transfer head 200 of the respective plate loader, a plurality of hydraulic cylinders 225 are mounted in upstanding relation below the cartridges of each magazine. Each hydraulic cylinder 225 has an upwardly directed piston rod 225a carrying a rectangular pusher plate 226 that is positionable from a retracted position below the cartridge (FIG. 17) to a raised plate supporting and lifting position (FIG. 23). For simultaneously actuating the hydraulic cylinders 225 for each magazine and to hold the pusher plate 226 in successive raised positions, inlet lines 225b, 225c to the cylinder 225 preferably are coupled to a common manifold, which in turn is connected through a normally closed air-operated valve to an air/oil reservoir in a known manner. Upon lowering of the plate loader transfer head 200 into plate receiving position (shown in phantom in FIG. 17) and actuating the cylinders 225 by pressurizing the air/oil reservoir, the stacks of plates in the magazine cartridges can be forced upwardly by the cylinder pusher plates into contact with respective suction cups 201a of the transfer head 200. Activation of vacuum pressure in the transfer head and appropriate actuation of the hydraulic cylinder check valves, will permit the transfer head 200 to remove the top plate 21 from each cartridge while the remaining stack of plates in the cartridges are held in such raised position ready for the next loading cycle. The transfer head 200 of each plate loader 50P, 50N preferably has proximity switches 228 associated with each vacuum pad 201 for sensing the presence of a plate 21 at the pad, and in the event a plate is not lifted by the pad, a signal may be generated for recycling the plate loader 50P one or more cycles and, if a plate remains missing, stopping the operation of the loader so as to permit manual loading of the missing plate, thereby preventing subsequent assembly of a defective cell element.

Upon depletion of the supply of plates in a magazine 170P, 170N, the hydraulic cylinders 225 may be reverse actuated by pressuring inlet lines 225c to retract the pusher plates 226 to a position below the magazine, as sensed by magnetic switch 227 (FIG. 14), to permit movement of the auxiliary loaded magazine into operative position over the hydraulic cylinders 225. To maintain proper orientation of the pusher plates 226 during lowering to such retracted position, each plate 226 is formed with an aperture 230 that is positionable over a respective tapered alignment pin 231 mounted on the frame 82 (FIGS. 14, 19 and 20).

In accordance with one aspect of the invention, the pre-fold mechanism is adapted to receive a first set of plates from the first plate loader, a pre-cut length of the separator sheet from the sheet transfer mechanism, and a second set of plates from the second plate loader, and thereupon fold the separator sheet into accordion folds with the first set of plates occupying folds on one side of the separator sheet and the second set of electrode plates occupying folds on the other side of the sheet. The illustrated pre-fold mechanism 51, as shown in FIGS. 14 and 24, includes a pair of elongated stationary supports 240, mounted on the apparatus frame 82 in spaced relation so as to define an elongated opening 241, and a folder 242 supported directly beneath the opening 241. The supports 240 are separated a distance less than the length of the plates 21 to be assembled such that the plate loader 50P may deposit the first set of plates 21P onto the supports 240 with the plates transversely disposed between the supports at longitudinally spaced intervals, as illustrated in FIG. 14.

The folder 242 has an elongated open top, channel-shaped housing 244 that is pivotably supported at one end in bearings 245 mounted on the apparatus frame 82 and is supported at its opposite end by a rod 246a of an air cylinder 246 mounted on the frame 82. Mounted within the folder housing 244 directly below the elongated opening 241 of the stationary supports 240 is a paddle assembly 250 comprising a plurality of paddles 51 coupled together by a scissor-type parallel linkage, as shown in FIGS. 24-28. Each paddle 251 has an upper head portion 251a of a width less than the spacing between the stationary supports 240 and is pivotably carried at its approximate mid-point by a pin 252 which in turn carries rollers 254 that are captively retained for rolling movement in tracks 255 formed in opposite sides of the channel housing 244. A web 256 covers the heads 251a of the paddles, and in this instance, has alternative portions 256a fixed to the upper faces of the paddle heads 251a, as viewed in FIG. 26, and alternative portions 256b flexibly connecting the upper and lower ends of adjacent fixed web portions 256a.

The paddles 251 are connected by parallel links 270 which each are pivotably connected at one end to the paddle pivot pin 252, at a center point to an intermediate paddle pivot pin 271 of the adjacent paddle, and at an opposite end to a lowermost paddle pivot pin 272 of a third paddle. By virtue of such linkage, it will be seen that when the paddle support rollers 254 are spaced apart in their tracks 255, as shown in FIG. 26, the paddles are in parallel relation at a relatively small angle to the horizontal with the heads 251a thereof disposed just slightly above (i.e., about 1/16 inch) the upper surface of the stationary plate supports 240 and the web 256 extended with the fixed and flexible web portions 256a, 256b defining a relatively shallow wave configuration. As the paddle support rollers 254 are moved into closer relationship, as shown in FIGS. 27 and 28, the parallel linkage forces the paddles to a more vertical orientation raising the heads 251a thereof to positions well above the upper surface of the stationary plates support 240 and forcing the flexible and fixed web portions 256a, 256b together to define an accordion folded configuration.

To selectively move the paddle support rollers 254 between such spaced and closed positions, and thereby pivot the paddles 251 between such lowered and raised positions, the paddle 251 at the end of the folder adjacent the pivot mounting 245 has its pivot pin 252 carried in a moveable head 275 mounted on a piston lug 276a of a rodless cylinder 276 supported on the underside of the folder housing 244 between brackets 278. The paddle 251 at the opposite end of the folder 242 has its pivot pin 252 fixed to the channel housing 244. Selective actuation of the cylinder 276 thereby enables the head 275 to move the paddle assembly 250 between an expanded or lower paddle position, shown in FIG. 24, and a contracted or raised paddle position, shown in FIG. 25. For sensing the lowered and raised paddle conditions, respective photocells 280, 281 are mounted on the frame 82 to sense the opposed limits of movement of the head 275 by making reflective light contact with a reflector plate 282 carried on top of the head 275 (FIGS. 14 and 29).

In order to retain electrode plates 21P, 21N and separator sheets 70a placed upon the supports 240 in proper position during the pre-fold operation, in the illustrated embodiment the lower portion of the channel housing 244 defines a vacuum plenum that is coupled to a vacuum pressure source through a line 284 (FIGS. 21-22). The paddles 251 and web 256 of the paddle assembly 250 in this case are formed with respective apertures 283 (FIGS. 26-28) to permit communication of vacuum pressure within the housing 244 to the plates and separator sheets placed on the pre-fold mechanism. For enhancing suction pressure through the paddle assembly to the plates 21 and separator sheet 70a supported thereon, the underside of the stationary supports 240 preferably have a suitable foam or like resilient sealing material secured thereto for making sealing contact with the upper surfaces of the folder housing 244 when in its normal horizontal position, such as shown in FIGS. 21, 22 and 26. In order to confine the vacuum plenum to the area below the paddles 251 as the paddle assembly 250 is contracted from the position shown in FIG. 26 to the position shown in FIG. 28, the head 275 carries a wiper blade 277 that moves within the housing 244 to limit the vacuum to the confines of the paddle assembly. It will be understood that the suction pressure within the housing plenum should be sufficient to firmly maintain the separator sheet 70a and plates 21 in place on the paddle assembly web 256 during the pre-fold operation. Again, because of contaminants from the electrode plates 21 drawn into the vacuum plenum, the line 284 preferably is coupled to a central filtering system before venting to the atmosphere.

Thus, in operation of the pre-fold mechanism, with the paddles 251 of the paddle assembly 250 in a lowered position, as shown in FIGS. 24 and 26, the first plate loader 50P may position a first set of plates 21P of one polarity onto the spaced supports 240, as shown in FIG. 14. The plates are positioned on the supports 240 with the same spacing and orientation as they are contained in the magazine cartridges 175P. The plates 21P preferably are positioned on the supports 240 directly above the flexible web portions 256b of the paddle assembly (FIGS. 14 and 24). With the first set of electrode plates 21P properly positioned on the supports 240, the sheet transfer mechanism 52 may transfer a pre-creased and cut separator sheet 70a from the creaser 48 to the pre-fold mechanism and deposit the sheet on top of the first set of plates 21P (FIG. 21). The separator sheet 70a preferably is positioned with the downwardly facing V-creases 73a above the ends of the paddles (FIG. 26). With the first set of plates and separator sheet in place and held in proper position by the vacuum in the housing 244, the second plate loader 50N may deposit a second set of plates 21N, onto the separator sheet 70a directly on top of the plates 21P of the first set (FIGS. 22, 24, 26). The plates 21N of the second set are again deposited on the pre-fold mechanism 51 in the same orientation and spacing as they were contained in the plate magazine 170N. It can be seen that the second set of plates 21N all have their lugs 28N on the same side of the pre-fold mechanism as the lugs of the first set of plates 21P, but that the plates 21N of the second set are positioned with their lugs on an opposite side of the plate than the plates of the first set.

With the first and second sets of plates 21P, 21N and separator sheet 70a properly positioned on the pre-fold mechanism supports 240, (FIGS. 24 and 26), the folder cylinder 276 may be actuated to move the head 275 in a paddle-raising direction, or to the right as viewed in FIG. 24. As the paddles 251 begin to raise, as shown in FIG. 27, each commonly positioned pair of plates 21P, 21N tend to tip into a pocket formed by adjacent flexible and fixed web portions 256a, 256b with the separator sheet 70a positioned between the plates and conforming to the gradually increasing accordion folds being formed in the web 256 under the combined action of the sheet 70a being drawn downwardly on the web 256 by the vacuum in the folder housing 244 and by the weight of the second set of plates 21N upon the separator sheet 70a. The paddle heads 251a, the web 256, the plates 21P, 21N and the separator sheet 70a also all tend to raise as the folding progresses. When the folder head 275 reaches its pre-fold position, as sensed by the photocell 281 making light reflective contact with the reflector 282 carried on the head 275, the separator sheet 70a shall have been folded with accordion folds, illustrated in FIG. 28, with pair of plates 21P, 21N of opposite polarity held in generally vertical orientation on opposite sides of the separator sheet 70a in folds or pockets of the web 256 defined by the flexible and fixed web sections 256a, 256b. The pre-folded separator sheet 70a and plates 21P, 21N will also have been raised to an elevation above the pre-fold mechanism supports 240, as shown in FIGS. 28 and 29, and the lugs 28P of the plates 21P of one polarity are all located on a common side of the pre-folded element and the lugs 28N of plates 21N of opposite polarity are on the opposite side.

In keeping with the invention, means are provided for engaging the pre-folded element, removing the pre-fold paddle assembly from the element, and further compressing or folding the prefolded element into final form. In the illustrated embodiment, means are provided for positioning the plates of the prefolded element into relatively precise alignment and then further compressing or folding the pre-folded element into final form in successive stages. To this end, the intermediate fold mechanism 54 includes a carriage 290 having rollers 291 mounted for movement on extensions of the rails 81, 251 (FIG. 31) from the intermediate fold station 39 (FIG. 29) to a position over an end of the pre-fold mechanism 51. The carriage 290 includes a pair of horizontal, transversely spaced base plates 292 and a pair of upstanding end plates 294, 295. For moving the intermediate fold carriage 290 on the rails 81, 251, a rodless cylinder 296 is supported from the apparatus frame 82 above a carriage 290 and has a piston rod lug 296a (FIG. 31) coupled to the carriage plate 95. The carriage base plates 292 have a transverse opening 292a that is greater than the width of the paddles 251 of the pre-fold mechanism 51 while less than the length of the electrode plates 21 being assembled. The carriage-end plates 294, 295 are formed with central openings 294a, 295a that permit the carriage 290 to be passed over the pre-folded element held in the pre-fold mechanism 51. By the actuation of the cylinder 296, therefore, the carriage may be moved over the end of the pre-fold mechanism with the base plates 292 positioned under the raised pre-folded element on opposite sides of the paddles 251. For sensing the position of the carriage 290 over the pre-fold mechanism 51, a limit switch 298 (FIG. 29) is mounted on the frame 82 for engagement by a stop 299 carried by the carriage.

For engaging the ends of the pre-folded element in the pre-fold mechanism 51 following such positioning of the intermediate fold carriage 290, the intermediate fold mechanism 54 includes a pair of downwardly directed U-shaped gates 300, 301 that can be moved from raised positions (FIG. 29) to lowered positions adjacent opposite ends of the pre-folded element. One gate 301 is mounted for movement in channels 302 (FIG. 31) secured on the carriage end plate 295 and can be raised and lowered by an air cylinder 304 fixed to the end plate 295 directly above the gate 301. The other gate 300 is similarly mounted on a plate 305 and can be selectively raised and lowered by actuation of an air cylinder 306.

With the intermediate fold mechanism gates 300, 301 in their lowered position adjacent the ends of the pre-folded element held in the pre-fold mechanism 51, means are provided for removing the pre-fold paddles 251 from the element. To this end, the air cylinder 246 may be actuated to retract its rod 246a and pivot the folder 242 in its pivot bearing 245, thereby lowering the pre-fold paddles 251 to a position below the stationary supports 240. For sensing the raised and lowered conditions of the paddles 251, in this instance, respective limit switches 308, 309 are mounted on the frame 82. With the paddles 251 in such lowered position, the pre-folded element remains in a relatively loose pre-folded condition supported on the intermediate fold carriage base plates 292 between the lowered gates 300, 301 and can be carried by the intermediate fold mechanism 54 from the pre-fold mechanism 51 to the succeeding station.

Upon such lowering of the paddle assembly 250, and preferably as the intermediate fold carriage 290 is transporting the pre-folded element, the plates 21 of the loosely folded element may be moved into relatively precise alignment by alignment plates 310 carried on the intermediate fold carriage 290, as shown in FIGS. 33–36. The alignment plates 310 in this instance are pivotably mounted on respective hubs 311 extending upwardly of the carriage base plates 292 and are movable between an open or element receiving position, shown in phantom in FIG. 33, and an element plate engaging and aligning position, shown in solid lines in FIG. 33. A bushing 312 in this case is interposed between the hub 311 and alignment plate 310.

For moving the alignment plates 310 between such pivoted positions, each alignment plate slidably carries a cam block 314 on a track 315 on an outer side thereof. Each cam block 314 is formed with a diagonal slot 316 that rides on a roller 318 mounted at a fixed location on the carriage base plate 292 (FIG. 35). The cam block 314 is secured to the end of a rod 319a of an air cylinder 319 also mounted on the alignment plate 310 such that actuation of the cylinder 319 will extend the rod 319a forcing the cam block 314 over the roller 318 and moving the alignment plate 310 into aligning position against the plates 21 of the pre-folded element. Reverse actuation of the cylinder 319 will retract the rod 319a and move the cam block 314 on the roller 318 so as to urge the alignment plate to the outwardly pivoted or open position, as sensed by a magnetic switch 313 on the cylinder 319.

To permit selective precise adjustment in the spacing between the alignment plates 310, the illustrated pivot hub 311 each has an eccentrically located mounting screw 320 extending upwardly through the carriage base plate 292 as shown in FIG. 36. By loosening the screw 320, the hub 311 may be selectively rotated about the screw 320 by turning an upstanding lug 311a until the proper hub and alignment plate position is achieved. Upon establishing such position, the screw 320 may be tightened to retain the hub 311 at the desired setting.

For compressing the pre-folded element components to a shorter or intermediate folded length following alignment of the electrode plates 21, means are provided for moving the intermediate carriage plate 305 so as to compress the element between the gates 300, 301. For this purpose, the plate 305 is mounted on a bearing block 325 for sliding movement on guide rods 326 extending between the upstanding carriage end plates 294, 295. For moving the carriage plate 305 on the guide rods 326, a pair of air cylinders 328 are mounted in the end plate 295 and have rods 328a coupled to the bearing block 325. Actuation of the cylinders 328 will retract the rods 328a drawing the plate 305 and gate 300 mounting thereon from a pre-fold element retaining position (FIG. 29) to an intermediate folded element position which draws the element components into more compact form (FIG. 30). Upon completion of such intermediate fold operation, the intermediate fold carriage 290 preferably will have returned to the intermediate fold station 39, which is sensed by a limit switch 330 made by a carriage stop 331. The intermediate folded element is then ready to be received by the final fold mechanism 55 for final forming.

The final fold mechanism 55 includes a carriage 335 that is movable between the intermediate fold station 39 (FIG. 37) through the final fold and tape applicator station 40 (FIGS. 38 and 40) to the element discharge station 41 (FIG. 41). The final fold carriage 335 has a frame construction with bearing blocks 336 mounted for sliding movement on guide rails 338. For moving the final fold carriage 335, a rodless cylinder 339 is mounted between the rails 338 and has a piston lug 339a engaged with a carriage mounting plate 335a. Limit switches 340, 341 sense the opposite limits of travel of the final fold carriage 335.

For engaging the intermediate folded element on the intermediate fold carriage 290, the final fold carriage 335 includes a clamping head 345 pivotably supported at one end by an upstanding portion of the carriage frame and at its other end by a rod 346a of a cylinder 346 mounted in upstanding relation on a lower portion of the carriage frame. The clamping head 345 has an element support platform 347, a stationary clamping plate 348, and an opposed movable clamping plate 349 carried at the end of a rod 350a of an air cylinder 350 mounted on the head. By actuation of cylinder 346, the clamping head 345 can be pivoted between a lowered position as shown in FIG. 37, and a raised, horizontal position as shown in FIG. 38. By the actuation of the cylinder 350, the clamping plate 349 is movable between an open or intermediate fold element receiving position and a closed or final fold position.

Upon completion of the intermediate fold operation and return of the carriage 290 to the intermediate fold station, the final fold carriage 335 may be advanced with its clamping head 345 in a lowered, open condition to a position directly beneath the pre-folded element, as shown in FIG. 37. The clamping head 345 may then be raised by the actuation of cylinder 346 to position the clamping plates 348, 349 in respective openings defined by the downwardly directed U-shaped gates 300, 301 of the intermediate fold carriage 290 at opposite ends of the intermediate folded element held therein. Such positioning of the final fold clamping head 345 is sensed by a photo eye 360 mounted on the final fold carriage 335 which will make light reflective contact with an associated reflector 361 mounted on the frame 82 through an aperture 362 in the clamping head 345. The intermediate fold carriage plate 305 may then be retracted by the reverse actuation of cylinders 328, the intermediate fold gates 300, 301 raised by the actuation of cylinders 306, 304, the final fold clamping plate 349 extended to its final fold position by the actuation of cylinder 350 to compress the element to a finally folded size, and the final fold carriage 345 moved out from under the intermediate fold carriage 290 by the actuation of cylinder 339 carrying the intermediate folded element in the clamping head 345 thereof.

Following actuation of the clamping head cylinder 350 and final folding of the element, continued movement of the final fold carriage on the rails 338 will transport the element through a series of tape applicators 56 where tape is applied about the element to secure it in assembled form (FIG. 40). In the illustrated embodiment four tape applicators 56 are employed, with the element being transported by the final fold carriage 335 between a pair of vertically spaced tape applicators on one side of the element and a similar pair of tape applicators at the other side of the element. The tape applicators 56, which may be of a known type sold by Minnesota Mining & Manufacturing Co., in this instance are mounted on frame plates 365 disposed immediately adjacent opposite sides of the path of travel of the final fold carriage 335. Each tape applicator includes a supply reel 366 of tape, a first spring biased tape applicator arm 368 about which a length of tape from the supply reel is trained for applying the tape to the forward face of the moving element as it strikes the arm and for urging the tape against the length of the element as it passes by the arm, a second spring biased applicator arm 369 for forcing the tape about the rear face of the element as it passes by that arm, and a tape cutter 370 adapted to sever the tape in response to actuation of a solenoid 371 following passage of the element by the second arm 370. The final assembled element thereby has strips of tape encircling the element at its opposite ends.

Following the taping operation, the final fold carriage 335 will continue to transfer the assembled and taped element with the clamping head 345 in the raised position until the carriage 335 reaches the discharge station 41 where the element is received in the transfer device 58 (FIG. 41). Upon reaching such position, the carriage 335 will make limit switch 341 (FIG. 38) and the photo cell 360 will make reflective light communication with a reflector 374 mounted on the apparatus frame at that station. The illustrated transfer device 58 includes a head 375 comprising a pair of opposed element receiving channels 376 held by brackets 378 on an upper side thereof, as viewed in FIG. 41, so as to permit the final fold clamping head 345 to move between the channels 376 on the underside thereof and position the assembled element into the head. The transfer head 375 in turn is mounted at the end of a splined shaft 380a of a combination air operated rotary and lineal actuator 380.

With the assembled element positioned in the transfer head 345, the final fold clamping head 345 may be lowered by the actuation of cylinder 346 which is sensed by the clamping head 345 interrupting light communication of the photo cell 360 with the reflector 374. The actuator 380 is then actuated to extend the splined shaft 380a to move the element carrying transfer head 375 to a position beyond the final fold carriage 335 (as shown in phantom in FIG. 42) and then rotate the shaft and head to vertically position the element with the lugs on an upper side thereof (as shown in solid lines in FIG. 42). For sensing such extended and rotated positions of the transfer head 375, respective magnetic switches 383, 384 are mounted on the actuator 380.

For the purpose of moving the element from the transfer head 375 onto the discharge conveyor 59 following such upright positioning of the element by the transfer device 58, an ejection device 385 is provided. The ejection device 385 in this instance includes a U-shaped head 386 mounted at the end of a rod 388a of an air cylinder 388, which in turn is mounted on the apparatus frame 82 directly below the transfer device 58. The U-shaped head 386 has outwardly flared ends to facilitate receiving the element in the transfer head 375 and the transfer head brackets 378 are formed to permit passage of one leg of the ejector head 386 between the brackets and element. Actuation of the cylinder 388 will move the head 386 from a retracted position, shown in FIG. 42, into an element engaging position in the transfer head 375 and then through the transfer head 375 to carry the element onto a power driven conveyor belt 390 of a discharge conveyor 59 with the element in upright position. For guiding movement of the assembled elements along the discharge conveyor in such condition, appropriate guide rods 391 are disposed along each side of the belt 309.

It will be appreciated that the illustrated apparatus can be operated on a continuous and uninterrupted basis. Moreover, to maximize productive output of the apparatus it will be understood that elements may be simultaneously processed at successive stations of the apparatus and where possible the various operating mechanisms may be returned to their original or ready positions while preceding operations continue in progress.

In keeping with the invention, control means is provided for coordinating each of the assembly operations in order to permit automatic and optimized element assembly. As diagrammatically illustrated in FIG. 44, the control means includes a master controller 395 which may comprise a conventional microprocessor-based programmable controller, such as a Gould Modicon 584 Programmable Controller, having a processor portion 396 and a memory portion 398 appropriately programmed to effect the sequential operations as hereinafter described. The master controller 395 in this case is adapted to communicate with and directly control functions of each of the operating mechanisms. In each instance the master controller 395 communicates through conventional input and output modules which convert incoming signals from the various sensing devices of the apparatus to signal levels compatible with the controller and which convert output signals of the controller to signal levels compatible with the apparatus.

In view of the foregoing, a programmed operating sequence of the illustrated apparatus, under control of the master controller, is as follows. At the beginning of an operating cycle, the separator sheet 70 from the supply reel 45 will have an end held by suction pressure of the vacuum pad 72 at the sheet supply station end of the creaser 48 with the sheet looped in the vacuum box 70 below the level of the photo eye 76 (FIG. 5). With the sheet puller 46 located at the sheet supply station end of the creaser 48 with its logic connector 115 engaging the station logic connector 115 a, upon raising of the upper creaser platen 126 as sensed by switch 134 (FIG. 11) and as the previously creased and cut sheet is transferred from the creaser as sensed by the fiber optic sensor 164, the transfer arm 88 of the sheet puller 46 is rotated from its retracted travel position to an outwardly extended position by the actuation of rotary actuator 95, as sensed by switch 96, and then is lowered into contact with the end of the sheet 70 on the vacuum pad 72 by the actuation of cylinder 101 (FIG. 5). Suction pressure in the transfer arm vacuum head 89 is then activated by the actuation of solenoid valve 109; suction pressure at the sheet supply station vacuum pad 72 is de-activated; the puller arm 88 is raised by the reverse actuation of cylinder 101 lifting the end of the sheet 70 from the pad 72; and the carriage is moved along the rails 81 away from sheet supply station 35 by the actuation of cylinder 85, disengaging the logic connectors 115, 115a and drawing a length of the separator sheet 70 into the creaser 48 (FIG. 7). As the separator sheet is drawn from the vacuum box 71, the sheet loop will raise in the box until the photocell 76 senses light from the reflector plate 78 causing energization of the reel motor 66 to feed additional sheet material.

Upon the sheet puller 46 reaching the opposite end of the creaser 48, the puller carriage logic connector 116 will engage the station logic connector 116a; the sheet 70 will be located above the vacuum pads 120, 121 at opposite ends of the creaser; and the sheet supply reel will continue to supply sheet material to the vacuum box 71 until the sheet loop again is lowered below the photocell 76 and the reel motor is de-energized. Following engagement of the logic connectors 116, 116a, the puller arm 88 is lowered by the actuation of cylinder 101 to position the forward end of the sheet 70 onto the creaser vacuum pad 121; suction pressure to the puller arm vacuum head 89 is de-activated by the reverse actuation of solenoid 109; suction pressure to the creaser vacuum pads 72, 120, and 121 is activated to hold the sheet 70 in position on the lower creaser platen 125; and the puller arm 88 is sequentially raised and rotated to its return travel position by the successive reverse actuation of cylinder 101 and rotary actuator 95.

Upon return of the puller arm 88 to its retracted travel position as sensed by switch 96, the upper creaser platen 126 is lowered into creasing position (shown in phantom in FIG. 11) by the deactuation of cylinder 129, with the electrically heated bars 138 of the creaser 48 forming transverse V-shaped creases in both the top and underside surfaces of the sheet at alternate longitudinally spaced intervals corresponding substantially to the width of the electrode plates to be assembled (FIG. 9). Upon such lowering of the creaser platen 126, the switch 135 is made and the electrically heated cutter wire 145 of the sheet cutter 49 is raised by the actuation of the cylinder 148 severing the sheet 70 to a discrete predetermined length 70a, as sensed by magnetic switch 149 (FIG. 9). The platen 126 is then raised by the actuation of cylinder 129 to permit removal of the cut and creased sheet 70a.

During the creasing and cutting operation, the sheet puller 46 is returned to the sheet supply station end of the creaser 48 along the rails 81 on one side of the creaser 48 by the reverse actuation of the cylinder 85, and the sheet transfer mechanism 52 is moved on the rails 151 into position adjacent the other side of the creaser 48 by the reverse actuation of the cylinder 154, thereby engaging the transfer mechanism logic connector 161 with logic connector 161a at the creasing station. Upon raising of the creaser platen 126, as sensed by switch 134, the transfer mechanism arms 152 are pivoted from their retracted travel positions to extended operative positions by the actuation of rotary actuators 159 and are lowered into engagement with the cut and creased sheet 70a by the actuation of cylinders 160 (FIG. 13). Suction pressure in the vacuum heads 158 of the transfer mechanism arms 152 is then activated; suction pressure in the creaser vacuum pads 120, 121 is de-activated; and the transfer arms lift the cut and creased sheet 70a from the lower creaser platen 125, by the reverse actuation of cylinders 160, for transfer to the pre-fold mechanism.

Prior to transferring the cut and creased sheet 70a from the creaser 48, the plate transfer head 200 of the plate loader 50P is lowered into plate receiving position over the plate magazine 170P by the actuation of cylinder 220 making switch 223 (shown in phantom in FIG. 17); the stacks of plates 21P in the magazine cartridges 175P are raised into engagement with respective vacuum pads 201 of the transfer head 200 by the actuation of hydraulic cylinders 225; and suction pressure to the transfer head vacuum pads 201 is activated. The transfer head 200 of the plate loader 50P is then raised by reverse actuation of cylinder 220, making switch 222, with each vacuum pad 201 of the transfer head carrying a plate 21P from a respective cartridge 175P as sensed by a respective proximity switch 228 (FIG. 18). The head 200 of the plate loader 50P then is extended into position over the pre-fold mechanism 51 (shown in phantom in FIG. 23) by the actuation of cylinder 206 as sensed by magnetic switch 215; the head is lowered into plate depositing position by the actuation of cylinder 220 making switch 223 (FIG. 23); vacuum pressure to the transfer head suction pads 201 is de-activated; and the transfer head 200 is raised and retracted by successive reverse actuation of cylinders 220 and 206, leaving a first set of plates 21P of common polarity positioned on the supports 240 of the pre-fold mechanism 51 (FIG. 14).

Following positioning of the first set of plates 21P onto the pre-fold mechanism 51 and return of the transfer head of the plate loader 50P to its retracted magazine location, as sensed by magnetic switch 215, the sheet transfer mechanism 52 is moved from the creaser 48 to the pre-fold mechanism 51 by the actuation of cylinder 154, engaging the logic connector 162 with a logic connector at the latter station and positioning the cut and creased sheet 70a over the pre-fold mechanism 51. The transfer mechanism arms 152 then are lowered by the actuation of cylinders 160 to place the sheet 70a on top of the first set of plates 21P on the pre-fold mechanism with the downwardly facing creases 73a located above the ends of the paddle heads 251a of the paddle assembly 250; suction pressure to the transfer arm vacuum pads 158 then is de-activated to release the sheet 70a; suction pressure to the folder housing 242 is activated; the transfer mechanism arms 152 are raised by reverse actuation of cylinders 160 leaving the sheet 70a in place on the pref-fold mechanism 51 (FIG. 21); and the arms 152 are retracted by the reverse actuation of rotary actuators 159 to permit return of the transfer mechanism 52 to the creasing station by reverse actuation of cylinder 154.

During the time the sheet transfer mechanism is transporting the sheet 70a to the pre-fold mechanism 51, the second plate loader 50N is engaging a second set of electrode plates 21N of opposite polarity to the first set for positioning onto the pre-fold mechanism upon completion of the sheet transfer operation. The plate loader 50N operates similarly to the plate loader 50P with the head 200 thereof being sequentially lowered into plate receiving position at the magazine 170N, raised to remove the set of plates 21N from the magazine 170N (FIG. 21), and extended to position the plates 21N over the pre-fold mechanism 51. Upon the positioning of a sheet 70a onto the pre-fold mechanism and the retraction of the transfer mechanism arms 152 to their travel positions, the head 200 of the plate loader 50N is lowered to place the set of plates 21N onto the separator sheet 70a at locations directly above the elements of the first set, with the lugs 28N thereof located on a common side of transfer mechanism as the lugs 28P of the first set of plates, but on an opposite side of the plate (FIG. 22). The transfer head 200 of the plate loader 50N then releases the plates 21N and is raised and retracted to its magazine position.

Upon placement of the second set of plates 21N onto the pre-fold mechanism and lifting of the head 200 of the plate loader 50N to its raised position above the plate load mechanism, the pre-fold paddle assembly 250 is actuated by the actuation of the cylinder 276. The paddles 251 of the paddle assembly thereby are moved from their lowered generally horizontal position (FIG. 26) to a generally upright, raised position (FIG. 28), with commonly located pairs of plates 21P, 21N falling into gradually increasing pockets or accordion folds of the web 256 of the paddle assembly with the separator sheet 70a positioned between the plates and conforming to the folds of the web 256 by virtue of the vacuum pressure from the folder housing 244 and the weight of the second set of plates 21N. The separator sheet thereby is compressed into accordion folds with the plates 21P, 21N alternately disposed in respective folds of the sheet 70a on opposite sides thereof, all of which is held in a raised position above the pre-fold mechanism supports 240 (FIG. 28).

Upon completion of such pre-folding of the element components, as sensed by the photocell 281 making light reflective contact with the reflector 282 carried on the folder head 275, the intermediate fold carriage 290 is moved from the intermediate fold station 39 (FIG. 29) into position over the pre-fold mechanism with the base plates 292 of the intermediate fold carriage 290 located under the elevated pre-folded element. Upon the intermediate fold carriage 290 making switch 298, the clamping gates 300, 301 thereof are lowered into positions immediately adjacent opposite ends of the pre-folded element, and the pre-fold paddle assembly 250 is lowered to a position below the pre-fold mechanism supports 240 by actuation of the cylinder 264 leaving the loosely pre-folded element supported on the intermediate fold carriage base plates 292 between the clamping plates 300, 301 (FIG. 32).

Upon lowering of the pre-fold mechanism paddle assembly 250, as sensed by switch 309, the immediate fold carriage 290 is moved away from the pre-fold mechanism by the actuation of cylinder 296 carrying the intermediate folded element. As the intermediate fold carriage is transported, the clamping plates 310 are pivoted into engagement with the pre-folded element by actuation of cylinders 319 forcing the plates of the element into substantial alignment (FIG. 33); the clamping plates 310 are then retracted to their open position by reverse actuation of cylinders 319 (FIG. 33) as sensed by switch 313; and the gate 300 is drawn inwardly against the pre-folded element by actuation of cylinders 328 to compress the element components to a shorter or intermediate folded length (FIG. 30).

Upon completion of the intermediate fold operation and return of the carriage 290 to the intermediate fold station 39 as sensed by switch 330, the final fold carriage 335 is advanced with its clamping head 345 in a lowered, open condition to a position directly beneath the pre-folded element making switch 340 (FIG. 37); the clamping head 345 is raised by the actuation of the cylinder 346 to position the clamping plates 348, 349 in openings defined by the downwardly directed U-shaped gates 300, 301 of the intermediate fold carriage 290, as sensed by the photocell 360 making light reflective contact with the reflector 361 mounted on the frame at such station; the intermediate fold carriage plate 305 is retracted by the reverse actuation of the cylinders 328; the intermediate fold gates 300, 301 are raised by the actuation of the respective cylinders 306, 304; the clamping plate 349 of the final fold mechanism is extended by the actuation of cylinder 350 to compress the element to a finally folded size (FIG. 38); and the final fold carriage 345 is moved out from under the intermediate fold carriage 290 by the actuation of the cylinder 339.

The final fold carriage 335 thereupon transports the finally folded element through the tape applicators 56 where tape is applied about the element to secure it in final assembled form 20 (FIG. 40) and then to the discharge station 41 where the element is received in the transfer head 375 of the transfer device 58 (FIG. 41), as sensed by switch 341 (shown in FIG. 38) being made by the final fold carriage 335 and photocell 360 making light reflective communication with the reflector 347 mounted on the frame at such station (FIG. 41). The final fold clamping head 345 is then lowered by the actuation of cylinder 346, as sensed by the interruption of light communication between the photocell 360 and reflector 374, leaving the completed element in the transfer device head 375. The transfer head 375 then is extended outwardly of the final fold carriage (as shown in phantom in FIG. 42) and rotated to vertically position the element (as shown in solid lines in FIG. 42) by operation of the actuator 380, as sensed by magnetic switches 383 and 384. The ejection device 385 then is extended by actuation of cylinder 388 to engage the element and position it on the discharge conveyor 59 for transfer to a succeeding battery assembly station.

From the foregoing, it can be seen that the apparatus and method of the present invention are adapted for the efficient assembly of battery cell elements comprising a relatively large number of electrode plates and a continuous, interleaved separator sheet. The apparatus assembles the elements with the electrode plates thereof in predetermined alignment and permits subsequent handling of the assembled elements without substantial disturbance of such plate alignment. The apparatus also may be operated automatically on a continuous and uninterrupted basis to achieve a high volume production of such battery cell elements.

We claim:

1. A method of assembling battery cell elements comprising the steps of positioning a first set of electrode plates of common polarity in a predetermined longitudinal array, positioning an elongated separator sheet over said first set of plates without affixing said plates to said separator sheet with permanent attaching means, positioning a second set of electrode plates of common polarity opposite to that of said first set onto said separator sheet in a predetermined longitudinal array without affixing said second set of plates to said separator sheet with permanent attaching means, and folding said separator sheet into accordion folds without said first and second sets of plates being affixed to said separator sheet with permanent attaching means and with the plates of said first set all occupying folds on one side of said separator sheet and the plates of said second set all occupying folds on the other side of said sheet.

2. The method of claim 1 including positioning said first and second sets of plates in longitudinal arrays at predetermined spaced intervals corresponding substantially to the width of the individual plates.

3. The method of claim 2 including positioning said second set of plates upon said separator sheet at locations above the plates of said first set.

4. The method of claim 2 in which the plates of said first set each have a terminal lug and are positioned in said predetermined longitudinal array with said lugs similarly oriented on a common end and side of said plates, and the plates of said second set each have a terminal lug and are positioned in said predetermined longitudinal array above the plates of said first set with the lugs thereof oriented on the same end as are the lugs of the plates of said first set, but on an opposite side of the plate.

5. The method of claim 1 including folding said separator sheet and plates into relatively loose accordion folds, and then further folding and compressing said sheet and plates into final assembled form with said plates disposed in relatively tight folds of said separator sheet.

6. The method of claim 5 including positioning the plates of said first and second sets into relatively precise alignment following said loose folding, and thereafter compressing said plates and separator sheet into said final assembled form.

7. The method of claim 5 including binding said further folded and compressed sheet and plates for securing the element in such final assembled form.

8. The method of claim 1 including positioning said first set of plates on a flexible support member, placing said separator sheet on said first set of plates while on said flexible support member, positioning said second set of plates on said sheet while said sheet and first set of plates are on said flexible support member, simultaneously folding said separator sheet and support member into relatively loose accordion folds with pairs of plates of said first and second sets occupying respective folds of said support member with said separator sheet therebetween, removing said support member from said sheet and plates to leave said plates of said first and second sets disposed in alternate relatively loose folds of said separator sheet, and compressing said separator sheet and plates into final assembled form with the plates of said first and second sets disposed in alternate relatively tight folds of said separator sheet.

9. The method of claim 8 including drawing a vacuum through said flexible support member for holding said sheet and plates in predetermined position on said support member during said loose folding.

10. The method of claim 9 including positioning said first set of plates onto said flexible support member from one side of said support member, and positioning said second set of plates onto said sheet from an opposite side of said support member.

11. The method of claim 1 included forming longitudinally spaced transverse creases in said separator sheet prior to positioning of said sheet onto said first set of plates, and folding said separator sheet along said creases.

12. The method of claim 11 including forming creases in opposite sides of said sheet at alternate longitudinally spaced intervals corresponding substantially to the width of said plates.

13. The method of claim 11 including positioning said creased separator sheet on said first set of electrode plates with said creases disposed adjacent opposite sides of each said plate, and positioning said second set of electrodes plates on said separator sheet at location directly above the plates of said first set.

14. The method of claim 11 including forming said creases in said sheet by heating said separator sheet at longitudinally spaced transverse fold lines.

15. A method of assembling battery cell elements at a plurality of stations including a separator sheet supply station, a first plate loading station, an element pre-fold station, a second plate loading station, and an element discharge station, comprising drawing a length of a separator sheet from said supply station, obtaining a first set of electrode plates of common polarity from said first plate loading station and positioning said first set of plates in a predetermined longitudinal array at said plate loading station, positioning said length of separator sheet onto said first set of plates at said pre-fold station, obtaining from said second plate loading station a second set of electrode plates of common polarity opposite to that of said first set and positioning said second set of plates in a predetermined longitudinal array on said separator sheet at said pre-fold station, folding said separator sheet at said pre-fold station into relatively loose accordion folds with said plates of said first and second sets occupying alternate folds on opposite sides of said sheet, thereafter further folding and compressing said separator sheet and plates into final assembled form with said plates held in relatively tight folds of said separator sheet, and thereafter transferring separator sheet and plates to said discharge station.

16. The method of claim 15 including positioning said first set of plates, separator sheet, and second set of plates onto a flexible support member at said pre-fold station; simultaneously folding said separator sheet and support member into relatively loose accordion folds with pairs of plates of said first and second sets occupying respective folds of said support member with said separator sheet therebetween; and removing said support member from said sheet and plates to leave said plates of said first and second sets disposed in alternate relatively loose folds of said separator sheet.

17. The method of claim 16 including drawing a vacuum through said flexible support member at said pre-fold station for holding said sheet and plates on said support member during folding of the separator sheet into relatively loose accordion folds.

18. The method of claim 16 including moving said first and second sets of plates into relatively precise alignment following said loose folding, and thereafter compressing said plates and separator sheet into final assembled form.

19. The method of claim 15 including transferring the further folded and compressed sheet and plates through a binding station and binding said sheet and plates in finally assembled form.

20. An apparatus for assembling battery cell elements having a plurality of electrode plates of alternating polarity separated by a continuous interleaved separator sheet comprising means for positioning a first set of electrode plates of common polarity in a predetermined longitudinal array, means for positioning an elongated separator sheet onto said first set of electrode plates without affixing said plates to said separator sheet with permanent attaching means, means for positioning a second set of electrode plates of common polarity opposite to that of said first set onto said spearator sheet in a predetermined longitudinal array without affixing said second set of plates to said separator sheet with permanent attaching means, and means for folding said separator sheet into accordion folds without said first and second sets of plates being affixed to said separator sheet by permanent attaching means and with said plates of said first and second sets occupying alternate folds on opposite sides of said sheet.

21. The apparatus of claim 20 in which said folding means includes a support means for receiving said first set of plates, separator sheet, and second set of plates; said support means being collapsible for folding said separator sheet into relatively loose accordion folds with pairs of plates of said first and second sets occupying alternate folds of said sheet; means for removing said support means from the loosely folded sheet and plates; and means for further folding and compressing said separator sheet and plates to final assembled form, following removal of the collapsible support means, with said plates of said first and second sets disposed in alternate relatively tight folds of said separator sheet.

22. The apparatus of claim 21 in which said support means includes a flexible web, and said support means is collapsible for simultaneously folding said separator sheet and web into relatively loose accordion folds with pairs of plates of said first and second sets occupying respective folds of said web with said separator sheet therebetween.

23. The apparatus of claim 22 including means for drawing vacuum through said support means for holding said sheet and plates in position on said web during folding of said sheet into relatively loose accordion folds.

24. The apparatus of claim 20 in which said first and second plate set positioning means position said plates at spaced intervals corresponding substantially to the width of the individual plates.

25. The apparatus of claim 20 including binding means, and means for transporting said sheet and plates through said binding means for securing said folded sheet and plates in assembled form.

26. An apparatus for assembling battery cell elements having a plurality of electrode plates of alternating polarity separated by a continuous interleaved separator sheet comprising a first plate loading station including means for positioning a first set of electrode plates of common polarity in a predetermined longitudinal array, means for positioning an elongated separator sheet onto said first set of plates, a second plate loading station including means for positioning a second set of electrode plates of common polarity opposite to that of said first set onto said separator sheet in a predetermined longitudinal array, a pre-fold station including means for folding said separator sheet into relatively loose accordion folds with the plates of said first and second sets occupying alternate folds on opposite sides of said sheet, and means for further folding and compressing the loosely folded sheet and plates into final assembled form with said plates held in alternate relatively tight folds of said sheet.

27. The apparatus of claim 26 including a sheet creasing station having means for forming creases in said elongated separator sheet at longitudinally spaced fold points prior to positioning of said sheet onto said first set of plates.

28. The apparatus of claim 27 in which said creasing means includes relatively movable elongated plates, at least one of said plates having a plurality of transversely disposed creasing bars, said creasing bars being electrically interconnected and having terminal ends which upon coupling to an electrical source permit current flow through the bars for hearing thereof.

29. The apparatus of claim 27 including separator sheet supply means, and first sheet transfer means for successively engaging an end of said sheet from said supply means and transferring said sheet into creasing means.

30. The apparatus of claim 28 in which said sheet supply means includes a motorized reel containing a continuous length of said separator sheet, vacuum chamber means located between said reel and said creasing means within which said continuous sheet is looped, said first sheet transfer means being operable to draw said sheet from said vacuum chamber upon transfer of said sheet into said creasing means, and means for sensing when said sheet is drawn from said chamber for energizing said motorized reel to feed an additional length of separator sheet into said chamber.

31. The apparatus of claim 29 in which sheet supply means supplies a continuous length of said separator sheet, and including sheet cutting means disposed at an end of said creasing means for cutting said continuous separator sheet to a predetermined length following transferring of said sheet into said creasing means.

32. The apparatus of claim 31 including second sheet transfer means for transferring a cut and creased length of said sheet from said creasing station to said pre-fold station.

33. The apparatus of claim 32 in which said creasing means includes relatively movable elongated platens having a plurality of transversely disposed creasing bars, and means for moving said platens from a sheet receiving position to a sheet creasing position.

34. The apparatus of claim 33 in which said first sheet transfer means includes a carriage mounted for movement between said sheet supply means and said creasing station on one side of said platens, and said second sheet transfer means includes a carriage mounted for movement on the other side of said platens between said creasing station and said pre-fold station.

35. The apparatus of claim 26 in which said pre-fold station folding means includes a collapsible paddle assembly having a plurality of pivotably mounted paddles, and means for moving said paddle assembly from an expanded position with said paddles disposed in relatively lowered, inclined positions with said separator sheet and plates horizontally disposed above the paddles to a folding position in which said paddles are pivoted to relatively raised, up-right positions causing said separator sheet to form a plurality of accordion folds between said paddles with said plates of said first and second sets in alternate folds of said sheet.

36. The apparatus of claim 35 in which said paddle assembly includes a flexible web positioned over and fixed to the ends of said paddles such that when said paddle assembly is in said expanded position said web has a relatively flat configuration and when in said folding position said web is folded into relatively loose accordion folds with pairs of plates of said first and second sets occupying respective folds of said web with said sheet between said pairs of plates.

37. The apparatus of claim 36 in which said pre-fold station includes spaced stationary supports for receiving and supporting the positioned first set of plates, sheet, and second set of plates; and said paddle assembly is mounted below said stationary supports such that when in said expanded position the ends of said paddles are disposed at about the elevation of said stationary supports and when in said folding position the ends of the paddles are raised and hold said loosely folded sheet and plates in elevated position above said stationary supports.

38. The apparatus of claim 37 including a paddle assembly housing within which said paddle assembly is supported for relative longitudinal movement between an expanded position extending substantially the length of said housing and a folding position contracted at one end of said housing, and said housing being pivotably mounted to permit lowering of said one housing end relative to said stationary supports to permit withdrawal of the contracted paddle assembly from said folded sheets and plates.

39. The apparatus of claim 38 in which said housing defines a vacuum chamber which permits drawing suction pressure through said paddle assembly.

40. The apparatus of claim 37 in which said further folding and compressing means includes an intermediate fold mechanism movable from an intermediate fold station to said pre-fold station for receiving said loosely folded sheet and plates held by said paddle assembly, means for lowering said pre-fold paddle assembly relative to said stationary supports upon positioning of said intermediate fold mechanism to said pre-fold station, and means for returning said intermediate fold mechanism to said intermediate fold station with said sheet and plates carried thereon following the lowering of said paddle assembly.

41. The apparatus of claim 40 in which said intermediate fold mechanism includes a carriage having plates means for positioning under said loosely folded sheet and plates held in said paddle assembly for supporting said loosely folded sheet and plates upon lowering of said paddle assembly.

42. The apparatus of claim 41 in which said intermediate fold carriage includes a pair of clamping gates, said gates being mounted for vertical movement between a raised position for permitting movement of said intermediate fold carriage to said prefold station and a lowered position adjacent opposite ends of said loosely folded sheet and plates following movement of said intermediate carriage to said prefold station.

43. The apparatus of claim 42 including means for moving said clamping gates relative to each other upon movement to their lowered position for compressing a loosely folded sheet and plates carried in said intermediate fold carriage to an intermediate folded form.

44. The apparatus of claim 43 in which said intermediate fold carriage gates have downwardly directed U-shapes which define an opening adjacent to the respective ends of the folded sheet and plates carried therein, said further folding means including a final fold mechanism which includes a carriage having a clamping head, the final fold carriage being movable between said intermediate fold mechanism and an element discharge station, said clamping head including a pair of clamping elements that are positionable into respective of said U-shaped gate openings upon positioning of said final fold carriage to said intermediate fold mechanism, and means for moving said final fold carriage clamping heads relative to each other for compressing said sheet and plates to finally assembled form.

45. The apparatus of claim 44 in which said final fold carriage clamping head is mounted for movement between raised and lowered positions, means for moving said final fold carriage to said intermediate fold mechanism with said clamping head in a lowered position, and means for moving said clamping head to said raised position upon positioning of said final fold carriage to said intermediate fold mechanism for locating said clamping elements in said openings of said intermediate fold gates.

46. The apparatus of claim 45 in which said intermediate fold carriage carries a pair of pivotably mounted alignment plates, and means for pivoting said alignment plates between an outwardly directed position for receiving a loosely folded sheet and plates from said prefold paddle assembly and an inwardly directed plate engaging and aligning position.

47. The apparatus of claim 40 in which said intermediate fold mechanism includes means for holding the loosely folded sheet and plates received at said pre-fold station, positioning the plates thereof into substantial alignment, and compressing the loosely folded sheet and plates into an intermediate assembly.

48. The apparatus of claim 35 in which said pre-fold station includes means for drawing a vacuum pressure through said paddle assembly for maintaining said sheet and plates in position thereon during movement of said paddle assembly to said pre-fold position.

49. The apparatus of claim 48 in which said further folding means includes a final fold mechanism movable between said discharge station and said intermediate fold mechanism for receiving the intermediate folded sheet and plates from said intermediate fold mechanism, compressing said sheet and plates into final assembled element form, and transporting the finally assembled element to said discharge station.

50. The apparatus of claim 49 including binding means for securing said element in the finally assembled form as said element is transported by said final fold mechanism to said discharge station.

51. The apparatus of claim 26 in which each said plate loading station includes a magazine for containing a plurality of longitudinally spaced stacks of electrode plates, said plate loading means for each plate loading station having a transfer head that is positionable at the respective loading station magazine for simultaneously engaging a plate from each said magazine stack, and means for moving each said plate transfer head from said respective magazine position to said pre-fold station for positioning the plates engaged thereby at said pre-fold station with the same longitudinal spacing and orientation as contained in said magazine.

52. The apparatus of claim 51 in which said magazine includes a plurality of cartridges for containing said stacks of plates, and means removably supporting said cartridges in said magazine.

53. The apparatus of claim 51 including means for raising said stacks of plates of each magazine into contact with the respective plate transfer head upon positioning of said head to said plate engaging position.

54. The apparatus of claim 51 in which each said plate loading station includes an auxiliary magazine for containing an additional supply of plates for use at the respective plate loading station, and said magazine and auxiliary magazine for each loading station are simultaneously movable into and out of operative position at the respective loading station.

55. The apparatus of claim 26 in which said means for positioning a separator sheet onto said first set of plates includes a sheet transfer carriage having at least one pivotably mounted sheet engaging arm, said arm being pivotable from a retracted travel position to an outawrdly extended sheet engaging position, and means for moving said carriage between a sheet receiving station and a sheet deposit station.

56. The apparatus of claim 55 in which said carriage arm includes a sheet engaging vacuum head, and means for communicating suction pressure to said head as said carriage is moved whereby a sheet may be retained in engagement with said head for transfer.

57. The apparatus of claim 56 in which said vacuum head has a plurality of depending pins for piercing a sheet as an incident to engagement with the sheet.

58. The apparatus of claim 55 including a master controller and respective releasably engagable station logic connecting means disposed at said sheet receiving and deposit stations at the opposite ends of the path of travel of said sheet transfer carriage, and said sheet transfer carriage having logic connectors for engaging said respective station lodging connecting means at each end of its path of travel whereby said master controller controls pivotable movement of said arm while the carriage is located at said respective station.

59. The apparatus of claim 26 in which said plate loading stations each include a plate transfer head having a plurality of vacuum pads for engaging and positioning a respective number of plates in predetermined spaced relation, and means for sensing the absence of a plate in each vacuum head pad during plate positioning.

* * * * *